(12) United States Patent
Liu et al.

(10) Patent No.: US 11,562,633 B1
(45) Date of Patent: Jan. 24, 2023

(54) SLIM TYPE TACTILE FEEDBACK DEVICE

(71) Applicant: TOPRAY MEMS INC., Hsinchu (TW)

(72) Inventors: Chin-Sung Liu, Hsinchu (TW); Hsiao-Ming Chien, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 0 days.

(21) Appl. No.: 17/547,558

(22) Filed: Dec. 10, 2021

(30) Foreign Application Priority Data

Nov. 19, 2021 (TW) ................................ 110143214

(51) Int. Cl.
*G08B 6/00* (2006.01)
*H02K 33/18* (2006.01)

(52) U.S. Cl.
CPC ............... *G08B 6/00* (2013.01); *H02K 33/18* (2013.01)

(58) Field of Classification Search
CPC .......... G08B 6/00; H02K 33/18; G06F 3/041; G06F 3/0488
See application file for complete search history.

(56) References Cited

U.S. PATENT DOCUMENTS

| | | | | |
|---|---|---|---|---|
| 2002/0182901 | A1* | 12/2002 | Koopman | H01R 13/2435 439/71 |
| 2009/0160763 | A1* | 6/2009 | Cauwels | G06F 3/016 345/156 |
| 2020/0313531 | A1* | 10/2020 | Liu | G06F 3/016 |

* cited by examiner

*Primary Examiner* — Quan Zhen Wang
*Assistant Examiner* — Mancil Littlejohn, Jr.
(74) *Attorney, Agent, or Firm* — Lin & Associates Intellectual Property, Inc.

(57) ABSTRACT

A slim type tactile feedback device is disclosed, including: a substrate, at least an overlapping plate, a support frame, a plurality of cushions and a vibration source; the overlapping plate being fixed to the substrate in a cantilever manner; the support frame including a frame, a void area, and at least a protruding support, the protruding support being a partial segment of the frame; the cushions being fixed between the substrate and the frame; the vibration source including a magnet set and a coil set, the magnet set and the coil set being fixed between the protruding support and the overlapping plate and located at outer side the substrate; the coil set and the magnet set being positioned correspondingly to each other and separated by a gap, the gap increasing when the substrate being pressed by finger, and the substrate moving back-and-forth through linkage motion of the vibration source.

10 Claims, 20 Drawing Sheets

SLIM TYPE TACTILE FEEDBACK DEVICE

BACKGROUND OF THE INVENTION

1. Field of the Invention

The present invention relates generally to a tactile feedback device, and more particularly, to a tactile feedback device applicable to touch pads, flat keyboards, tablet computers and similar electronic devices to satisfy the slim type structure requirements.

2. The Prior Arts

Tactile feedback is a common function of electronic products, and is commonly used in electronic devices such as touch pads, flat keyboards, and tablet computers. The concept of tactile feedback is to simulate traditional mechanical keyboards and mice, and generate vibration feedback during touch operations. FIG. 1 and FIG. 2 are the exploded view and side view of a conventional tactile feedback device. The tactile feedback device includes a substrate 11, a frame 12, a plurality of cushions 13, and a vibration motor 14. The plurality of cushions 13 are connected between the substrate 11 and the frame 12, and the vibration motor 14 is installed on the bottom surface of the substrate 11, whereby when the vibration motor 14 vibrates, the soft cushion 13 helps the substrate 11 and the vibration motor 14 to generate a resonance frequency and a good vibration feedback is obtained at the operating position on the substrate 11. However, the above-mentioned components are arranged in a stacked manner. As shown in FIG. 2, because the size of the vibration motor 14 is large, it generally protrudes from the bottom surface of the frame 12, which increases the thickness of the original frame (Z-axis size), and the protruding position of the vibration motor 14 will affect the original configuration of the electronic components. As a result, related circuits or electronic components to be designed around the vibration motor 14, which increases the design and manufacturing troubles of the manufacturer, which is also detrimental to the demand for thinner products.

SUMMARY OF THE INVENTION

In order to solve the above-mentioned problems, the primary objective of the present invention is to provide a thin tactile feedback device in which a vibration source is arranged on a frame and located outside the tactile effective area of a substrate, thereby reducing the size of the location where the vibration source is located, to achieve the goal of product thinning.

To achieve the foregoing objective, the present invention adopts the following technical solutions:

The present invention provides a slim type tactile feedback device, including: a substrate, at least an overlapping plate, a support frame, a plurality of cushions, and at least a vibration source; the overlapping plate is fixed to the substrate and is cantilevered extending to the outside of the substrate; the support frame includes a frame, a void area formed by the frame, and at least a protruding support, the protruding support is a partial section of the frame, and the protruding support is U-shaped and protruding in a direction the same as the direction in which the substrate is arranged on the frame; the protruding support has an inner wall and forms an accommodating space; the plurality of the cushions are fixed between the substrate and the frame; the vibration source includes a magnet set and a coil set, the magnet set and the coil set are fixed between the protruding support and the overlapping plate, and located outside the substrate, the coil set is positioned corresponding to the magnet set and is separated by a gap, and when pressed by a finger during touch operation, the gap only increases in the substrate, and the operation of the vibration source drives the substrate to generate back-and-forth vibration.

In a preferred embodiment, the protrusion height of the protruding support is lower than the top surface of the substrate, and the stack size of the position where the vibration source is located is smaller than the size of the substrate and the support frame after being stacked.

In a preferred embodiment, the magnet set is located in the accommodating space, the coil set is fixed on the overlapping plate, the magnet set includes a plurality of magnets arranged side by side, and the plurality of the magnets are fixed on the inner wall, the coil set includes a plurality of coils and a circuit board, the plurality of coils are fixed on the circuit board side by side, and the circuit board is fixed on the overlapping plate, so that the plurality of coils are on the outer side of the substrate and are located correspondingly to the plurality of magnets located above.

In a preferred embodiment, the coil set is located in the accommodating space, the magnet set is fixed on the overlapping plate, the coil set includes a plurality of coils and a circuit board, and the plurality of the coils are arranged side by side and fixed on the circuit board, the circuit board is fixed on the inner wall, the magnet set includes a plurality of magnets arranged side by side, and the plurality of the magnets are fixed on the overlapping plate, so that the plurality of magnets are on the outer side of the substrate and are located correspondingly to the plurality of coils located above.

In a preferred embodiment, the magnets are arranged in a direction so that the magnetic pole is parallel to the frame where the vibration source is located, and the direction of the back-and-forth vibration generated by the vibration source is parallel to the frame.

In a preferred embodiment, the magnets are arranged in a direction so that the magnetic pole is perpendicular to the frame where the vibration source is located, and the direction of the back-and-forth vibration generated by the vibration source is perpendicular to the frame.

In a preferred embodiment, the frame has at least a cantilever support, the cantilever support is partially fixed to the substrate, and the extension direction of the cantilever support is perpendicular to the direction of the back-and-forth vibration of the vibration source.

In a preferred embodiment, the end of the cantilever support away from the connection with the frame is an end area, and the end area is fixed to the substrate.

In a preferred embodiment, the cantilever support also forms at least a neck section with a narrower width.

In a preferred embodiment, the frame has at least a pair of cantilever supports, the pair of cantilever supports are parallel to each other and located on both sides of the void area, the cantilever supports are partially fixed to the substrate, and the cantilever supports extend in a direction perpendicular to the direction of the back-and-forth vibration of the vibration source.

In a preferred embodiment, the end of the cantilever support away from the connection with the frame is an end area, and the end area is fixed to the substrate.

In a preferred embodiment, a plurality of vibration sources is provided, and located at opposite position between the protruding support and the overlapping plate, the frame has at least a cantilever support, and the back-and-forth vibration directions of the vibration sources are parallel to one another and are perpendicular to the extension direction of the cantilever support.

In a preferred embodiment, the substrate is one of a touch pad, a flat keyboard, a touch screen of a tablet computer, and the like.

Compared with the prior art, the present invention has the following specific effects:

1. The longitudinal size of the location of the vibration source is smaller than the total size of the tactile feedback device, thereby meeting the demand for thinner products.

2. The vibration source is arranged on the substrate and the frame, and there is no outwardly protruding structure, therefore, the arrangement does not affect the configuration of the circuits or electronic components in the original electronic device.

3. To obtain tactile feedback of uniform vibration, the present invention can add at least one or a pair of cantilever supports to the frame, and make the vibration direction of the vibration source perpendicular to the extension direction of the cantilever supports, thereby obtaining uniform vibration feedback.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

The technical solutions of the present invention will be clearly and completely described below in conjunction with specific embodiments and drawings. It should be noted that when a component is referred to as being "mounted on or fixed to" another component, it means that it can be directly on the other component or an intermediary component may also exist. When an element is considered to be "connected" to another element, it means that it can be directly connected to the other element or there may be an intermediary element at the same time. In the illustrated embodiment, the directions indicate that up, down, left, right, front and back, etc. are relative, and are used to explain that the structure and movement of different components in the embodiment with respect to one another. These representations are appropriate when the part is in the position shown in the figure. However, if the description of the component location changes, it is considered that these representations will also change accordingly.

Unless otherwise defined, all technical and scientific terms used herein have the same meaning as those commonly understood by those skilled in the art of creation. The terminology used herein is only for the purpose of describing specific embodiments, and is not intended to limit the present invention. The term "and/or" as used herein includes any and all combinations of one or more related listed items.

Figure 1:
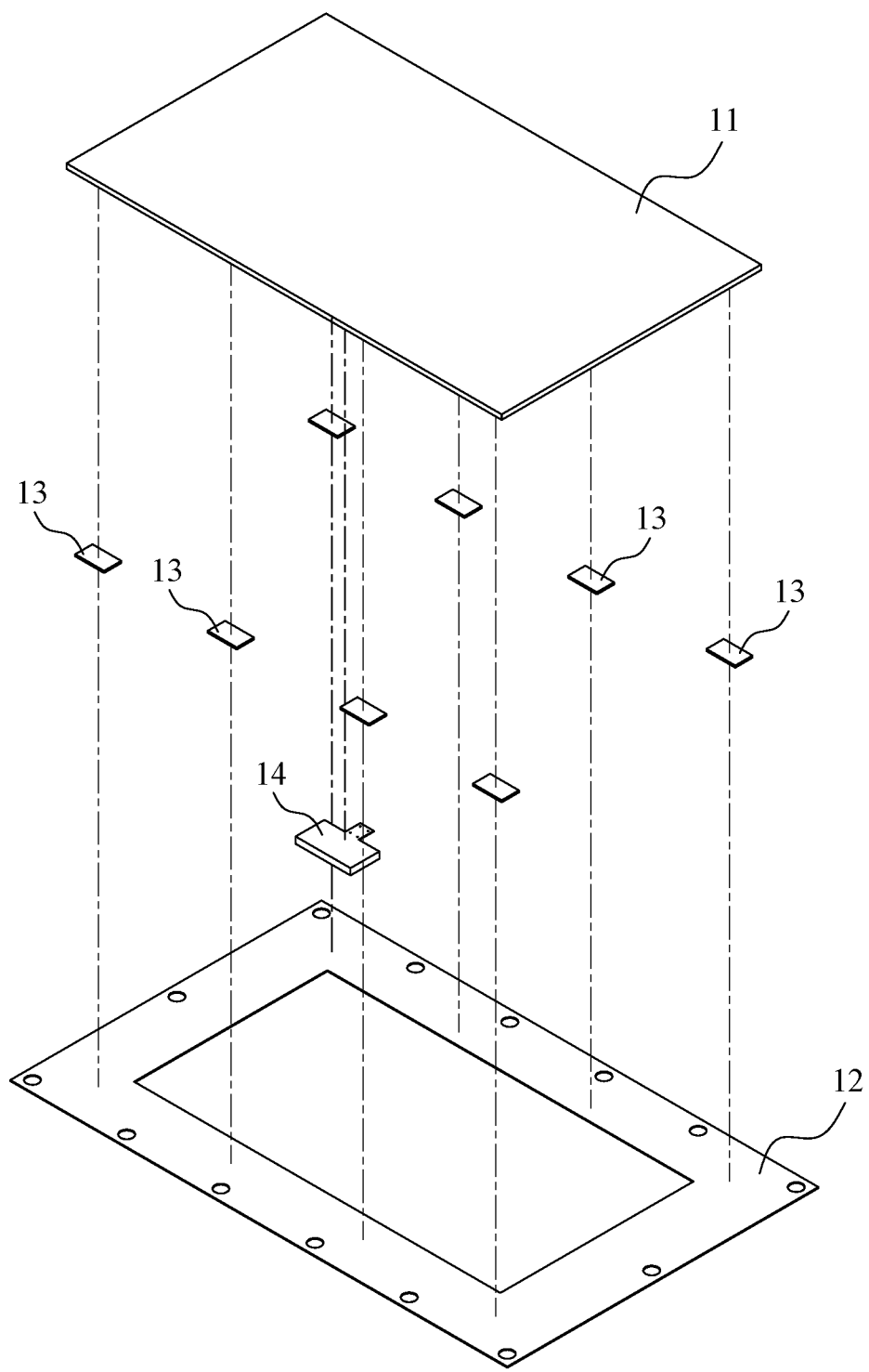
FIG. 1 is an exploded view of a conventional tactile feedback device.
Figure 2:
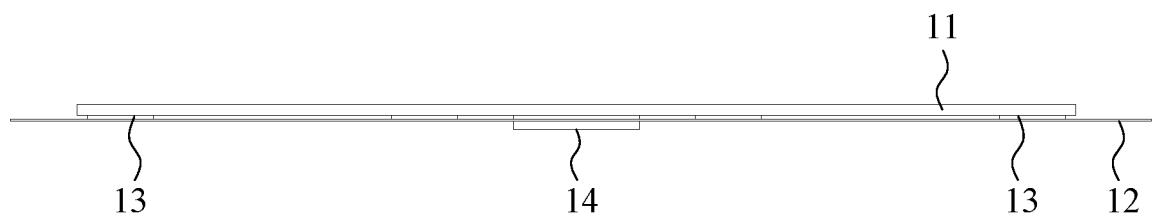
FIG. 2 is a side view of a conventional tactile feedback device.
Figure 3:
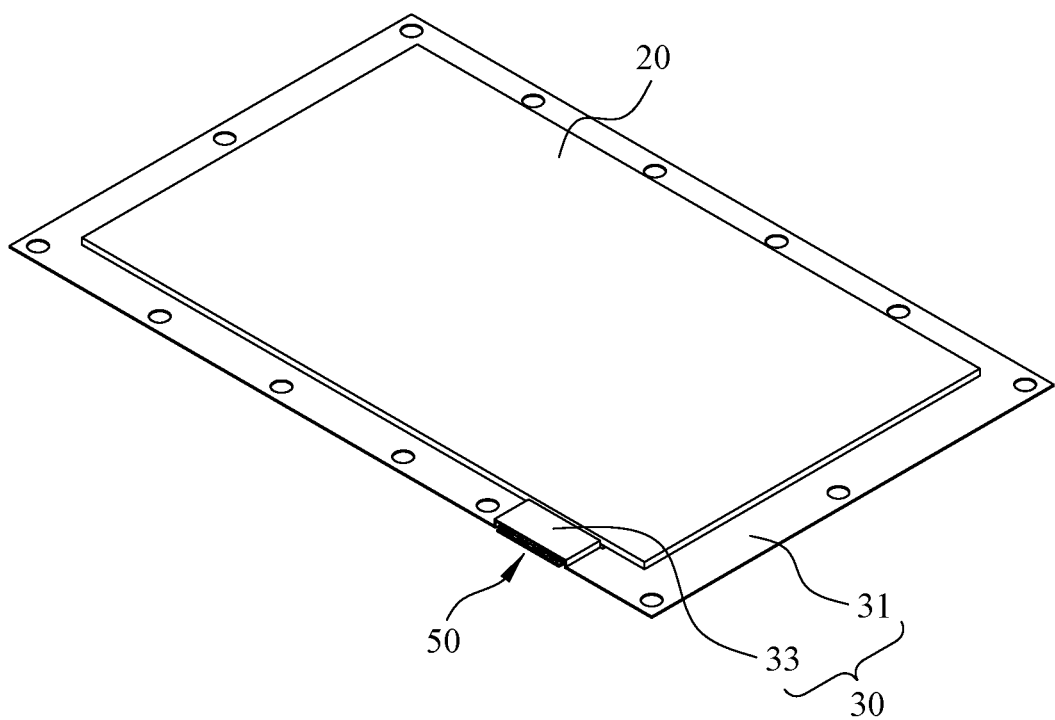
FIG. 3 is a perspective view of the first embodiment of the slim type tactile feedback device of the present invention.
Figure 4:
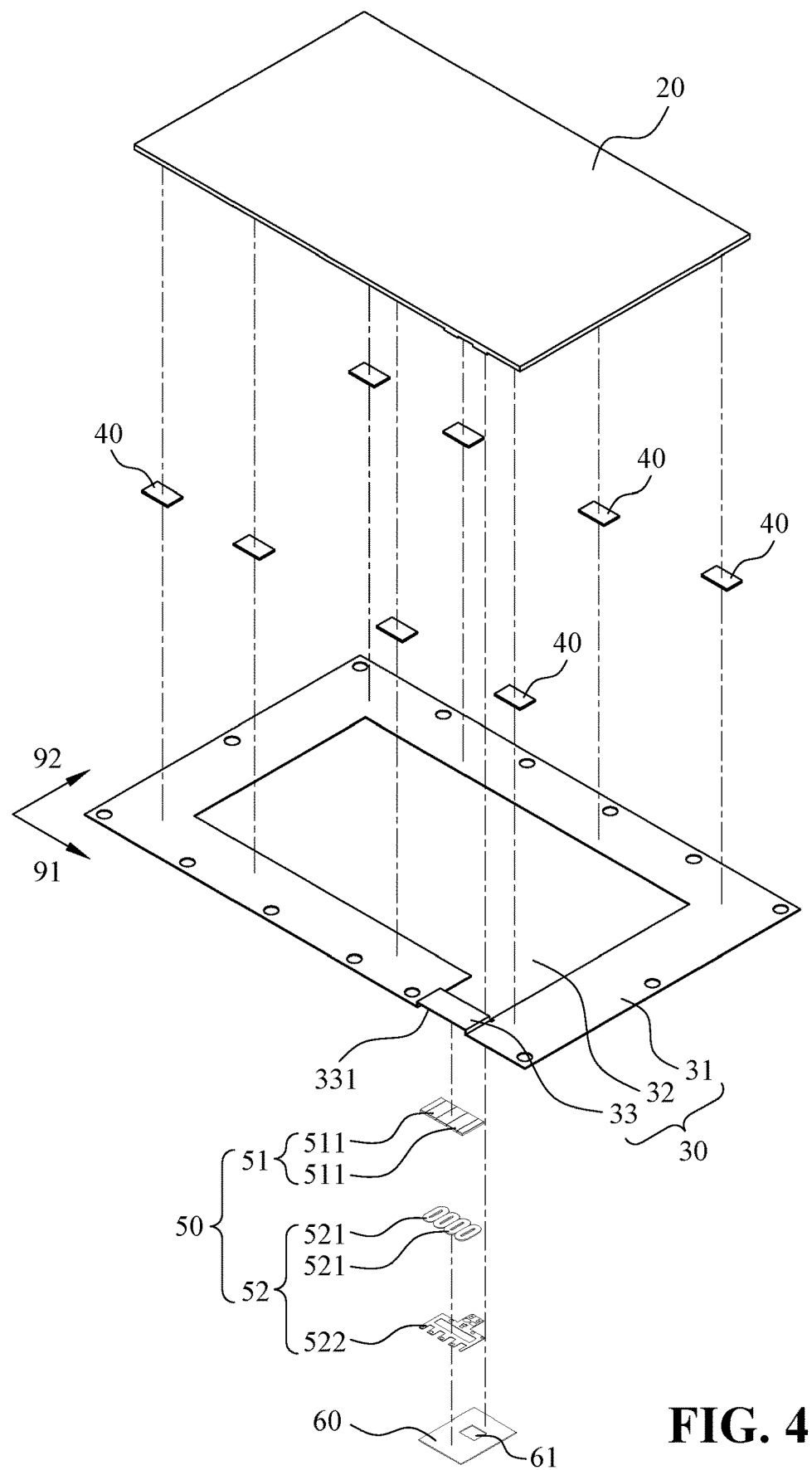
FIG. 4 is an exploded view of the first embodiment of the slim type tactile feedback device of the present invention.

FIG. 3 and FIG. 4 are a three-dimensional view and an exploded view of the first embodiment of the slim type tactile feedback device of the present invention, respectively. The slim type tactile feedback device of the present invention includes a substrate 20, a support frame 30, a plurality of cushions 40, at least one vibration source 50, and at least one overlapping plate 60. The overlapping plate 60 is fixed to the substrate 20, and the overlapping plate 20 extends outside the substrate 30 in a cantilever manner. The support frame 30 includes a frame 31, a void area 32 formed by the frame 31, and at least one protruding support 33, and the protruding support 33 is a partial section of the frame 31. The vibration source 50 includes a magnet set 51 and a coil set 52. The magnet set 51 and the coil set 52 are fixed between the protruding support 33 and the overlapping plate 60. In the present embodiment, the magnet set 51 is fixed to the protruding support 33, the coil set 52 is fixed to the overlapping plate 60. The cushions 40 are fixed between the substrate 20 and the frame 31 to maintain a gap between the magnet set 51 and the coil set 52; thereby, the vibration source 50 drives the substrate 20 to generate back-and-forth vibrations when operating, allowing the user to touch the substrate 20 with a finger to obtain a good vibration and tactile feedback. In the present invention, because the magnet set 51 and the coil set 52 are respectively disposed on the protruding support 33 and the overlapping plate 60, and are located outside the substrate 20, the size of the stack at the position where the vibration source 50 is located is smaller than the stacked size of the substrate 20, the cushion 40 and the support frame 30, and thereby achieving the objective of thinning the product.

Next, a detailed description of each component follows: the substrate 20 is an electronic device that can provide touch sensing, such as a touchpad, a flat keyboard, a touch screen of a tablet computer, etc., touched by fingers, stylus or other contact interface. When in contact, a corresponding electronic signal is generated, and the vibration source 50 can be synchronously driven to generate vibration, so that the operating position of the contact point can sense the tactile feedback effect of the vibration.

The shape of the support frame 30 is basically rectangular. For the convenience of subsequent description, the long side direction is defined as the X direction 91, and the short side direction is defined as the Y direction 92. The support frame 30 is mainly responsible for carrying the substrate 20, and the support frame 30 includes the frame 31, the void area 32 in the middle, and at least one protruding support 33. The protruding support 33 is located in a partial section of the frame 31. In the present embodiment, the protruding support 33 is set in the X direction 91 of the frame 31. The protruding support 33 has an inverse-U shape and the direction of protruding is the same as the substrate 20 arranged on the frame 31. The protruding support 33 has an inner wall 331 and forms an accommodating space 332, the magnet set 51 is located in the accommodating space 332, and the coil set 52 is fixed on the overlapping plate 60, at position corresponding to the magnet set 51 above. In the present embodiment, the magnet set 51 is fixed to the frame 31 as a stator, and the coil set 52 is fixed to the substrate 20 as a mover, so that when a finger presses the substrate 20, the principle that the stator and the stator must stay away is satisfied; that is, the distance between the coil set 52 and the magnet set 51 will only increase but not shrink, so as to avoid unnecessary collisions during operation. In addition, the vibration source 50, though disposed at the frame 31, is also located outside the tactile effective area of the substrate 20.

The vibration source 50 includes the magnet set 51 and the coil set 52. The magnet set 51 includes a plurality of magnets 511 arranged side by side, and a plurality of the magnets 511 are fixed facing downward to the inner wall 331. The coil set 52 includes a plurality of coils 521 and a circuit board 522. The coils 521 are arranged side by side and fixed to the circuit board 522. When the circuit board 522 is energized, the coils 521 can generate opposite magnetic poles. The circuit board 522 is fixed to the overlapping plate 60, and then the overlapping plate 60 is fixed to the substrate 20, thereby allowing the overlapping plate 60 to carry several coils 521 outside the substrate 20 in a cantilever manner. The overlapping plate 60 also has a window 61 through which external circuits are electrically connected to the circuit board 522. When the magnets 511 are arranged in different directions, the magnetic poles will also be in different directions, and ultimately result in different back-and-forth vibration directions generated by the vibration source 50. In the present embodiment, the magnetic poles of the N pole and S pole of the magnet 511 are parallel to the X direction 91, therefore, the vibration direction generated by the vibration source 50 is the X direction 91.

The cushion 40 is fixed to the substrate 20 and the frame 31 by the upper and lower end faces, respectively, as a medium for connecting the support frame 30 and the substrate 20, and the material of the cushion 40 must help the substrate 20 and the vibration source 50 generate a resonance frequency, so that a huge vibration can be generated with a small periodic driving force to obtain a good vibration feedback. The cushions 40 can be made of silicon, foam, etc., and are evenly distributed between the frame 31 and the substrate 20.

Figure 5:
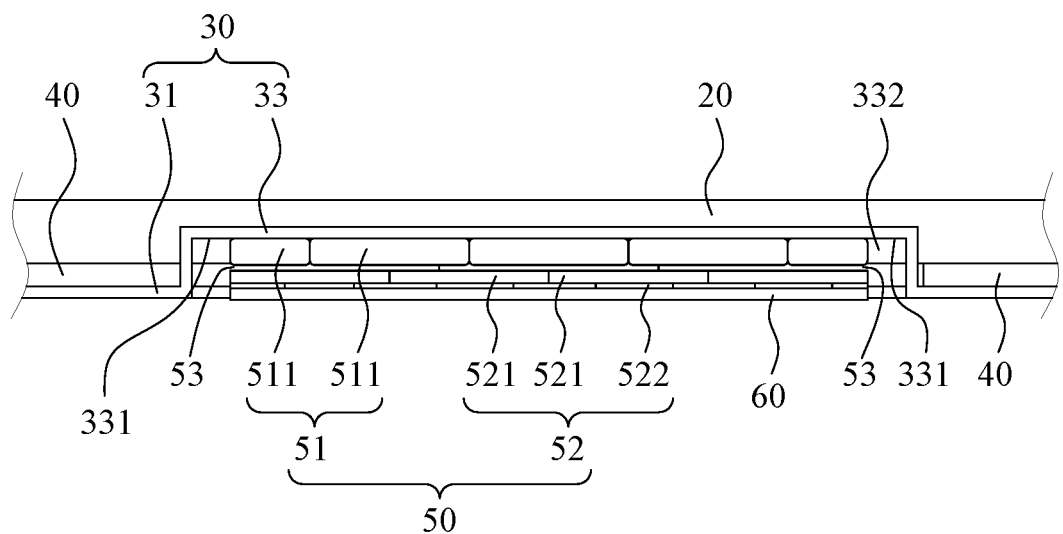
FIG. 5 is an enlarged side view of the location of the vibration source of the first embodiment of the slim type tactile feedback device of the present invention.

As shown in FIG. 5, the present invention fixes the plurality of magnets 511 of the magnet set 51 facing downwards on the inner wall 331 of the protruding support 33, and the plurality of coils 521 are fixed to the overlapping plate 60 on a side of the substrate 20 extending outward, the stacked size at the location where the vibration source 50 is located is smaller than the stacked size of the substrate 20 and the support frame 30, thereby achieving the objective of thinning. In addition, the vibration source 50 is disposed on the frame 31 and is located outside the tactile effective area of the substrate 20. The structure without protruding downward helps reduce the impact on the original electronic component configuration, and is more conducive to the demand for thinner products.

Figure 6:
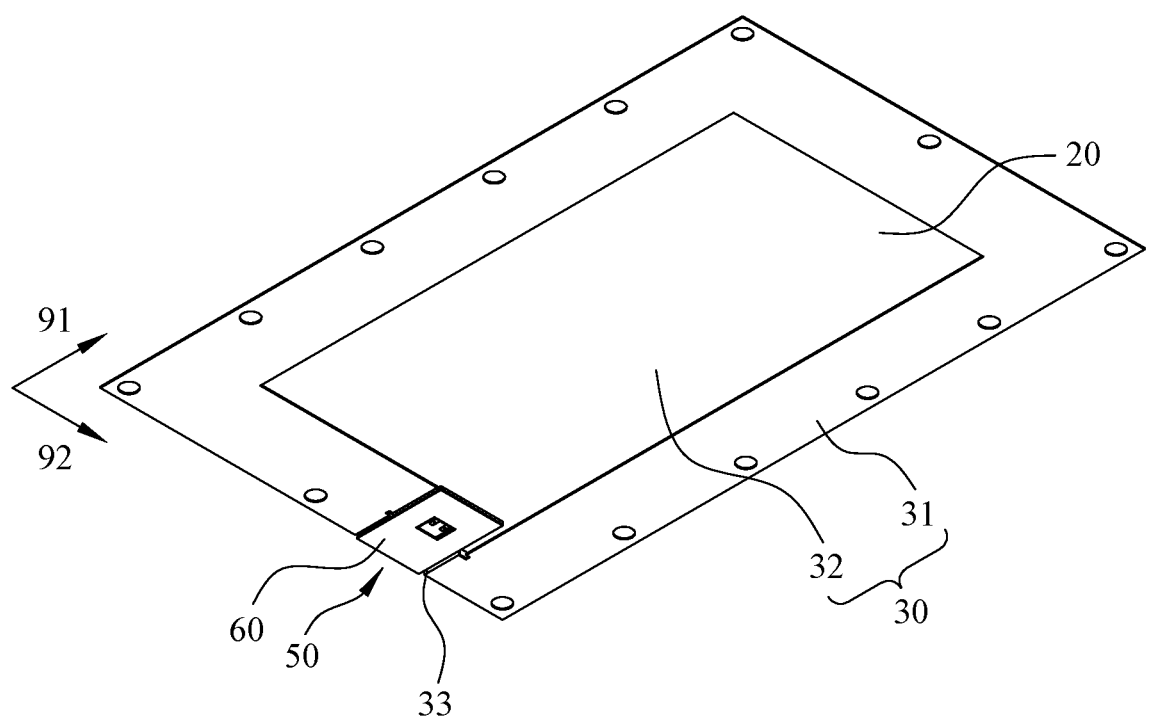
FIG. 6 is a perspective view of the second embodiment of the slim type tactile feedback device of the present invention from the bottom.

The design of the present invention can be widely applied to a variety of structures, and various embodiments are described below. FIG. 6 is a perspective view of the second embodiment of the present invention from a bottom angle. In the present embodiment, the installation position of the vibration source 50 is changed to meet the requirements of different products. In the present embodiment, the support frame 30 still includes the frame 31, the void area 32 and the protruding support 33, but the protruding support 33 is arranged in the Y direction 92, and the rest of the structure of the vibration source 50, the substrate 20, the cushion 40 and the overlapping plate 60 are the same as the earlier embodiment, and the direction of the back-and-forth vibration generated by the vibration source 50 is the Y direction 92 this time.

Figure 7:
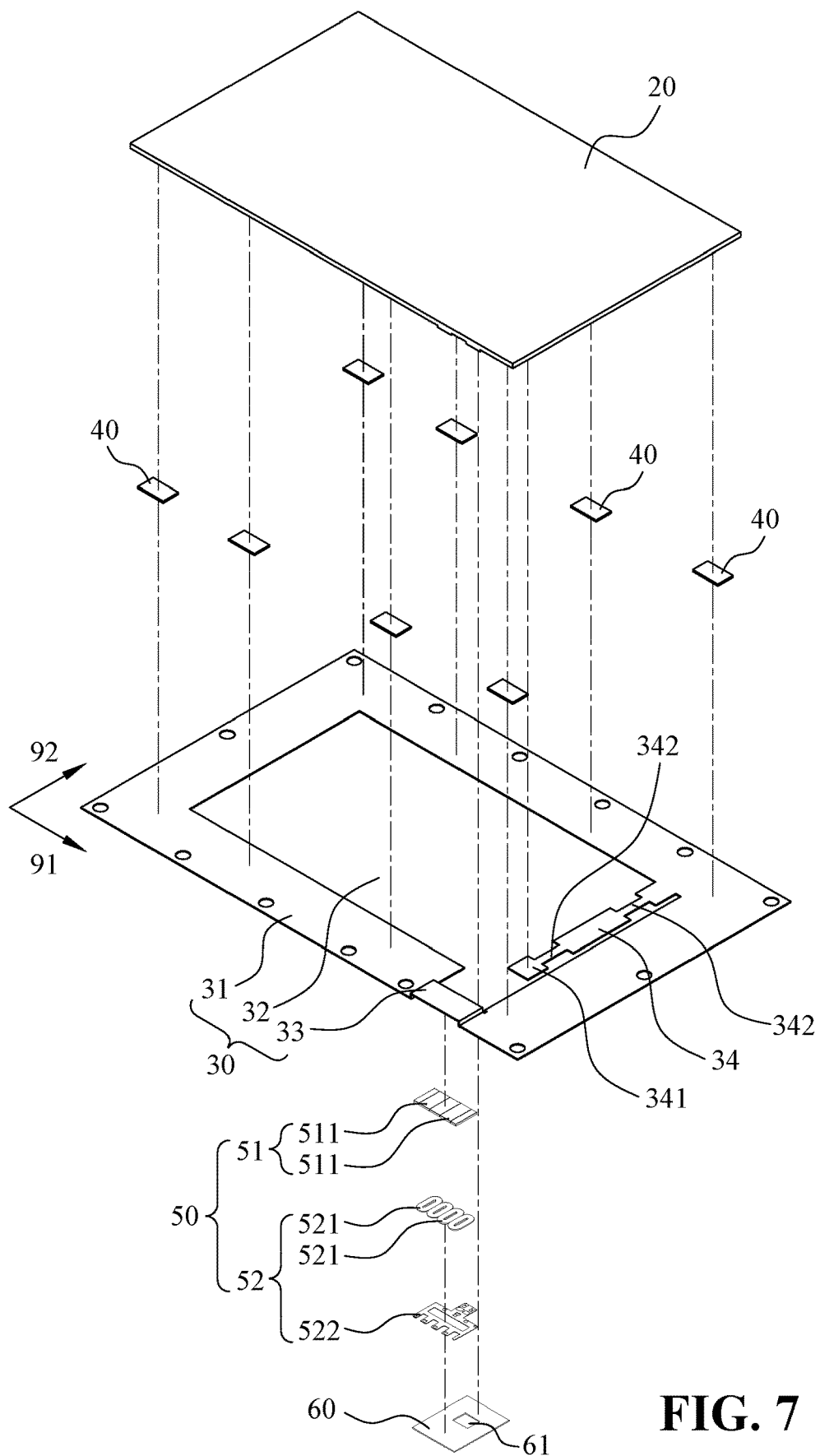
FIG. 7 is an exploded view of the third embodiment of the slim type tactile feedback device of the present invention.
Figure 8:
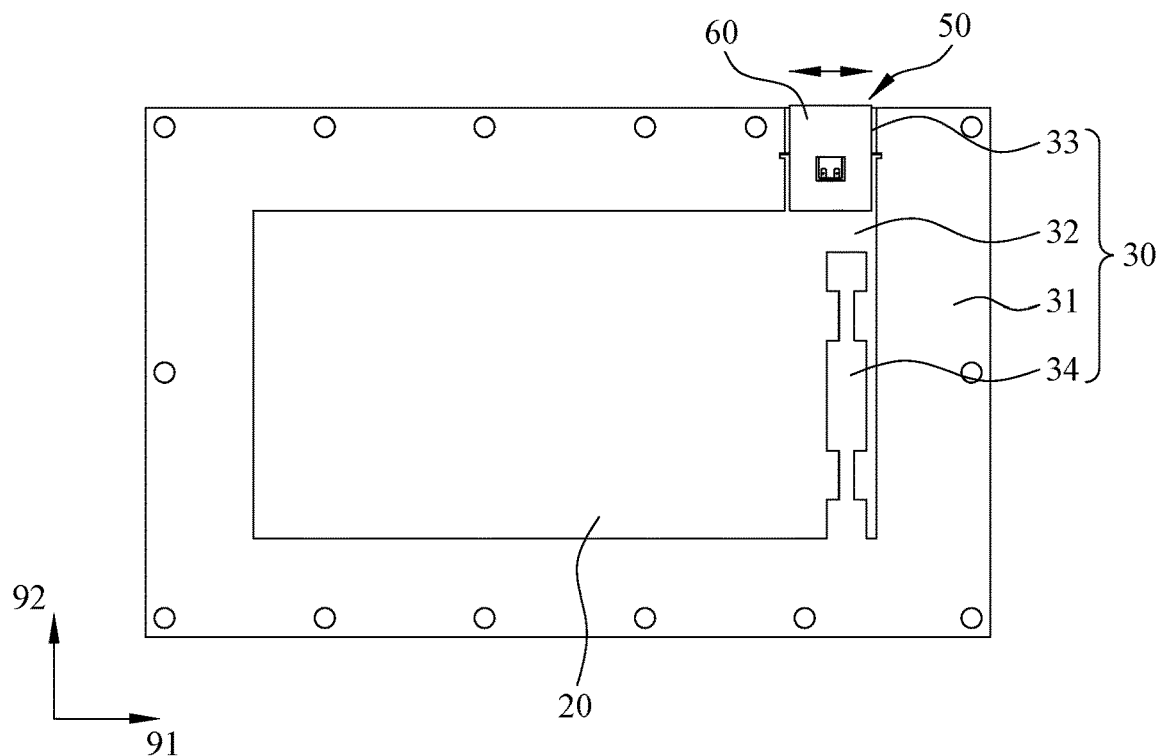
FIG. 8 is a bottom view of the third embodiment of the slim type tactile feedback device of the present invention.

In the above embodiment, the vibration source 50 of the present invention is set at a position deviated from the center of the substrate 20. When the vibration occurs, the substrate 20 may have uneven vibration feedback at different operating positions. To address this issue, the present invention also provides different embodiments. FIG. 7 and FIG. 8 are an exploded view of the third embodiment of the present invention and a perspective view from the bottom angle, respective. The main purpose of the present embodiment is to improve the structure of the support frame 30 so as to offset part of a rotational torque when the vibration source 50 vibrates. In the present embodiment, the support frame 30 further includes at least one cantilever support 34, the cantilever support 34 is connected to the frame 31 and is located in the void area 32, and the cantilever support 34 is partially fixed to the substrate 20. In the embodiment, the end of the cantilever support 34 away from the frame 31 is an end area 341, and the end area 34 is fixed to the substrate 20. In addition, the cantilever support 34 also forms at least one neck section 342 with a narrower width. In the present embodiment, there are two neck sections 342. In addition, in order to make the vibration more even, the vibration direction generated by the vibration source 50 must be perpendicular to the extension direction of the cantilever support 34. In the present embodiment, the vibration direction generated by the vibration source 50 is the X direction 91, and the cantilever support 34 is parallel to the Y direction 92.

Figure 9:
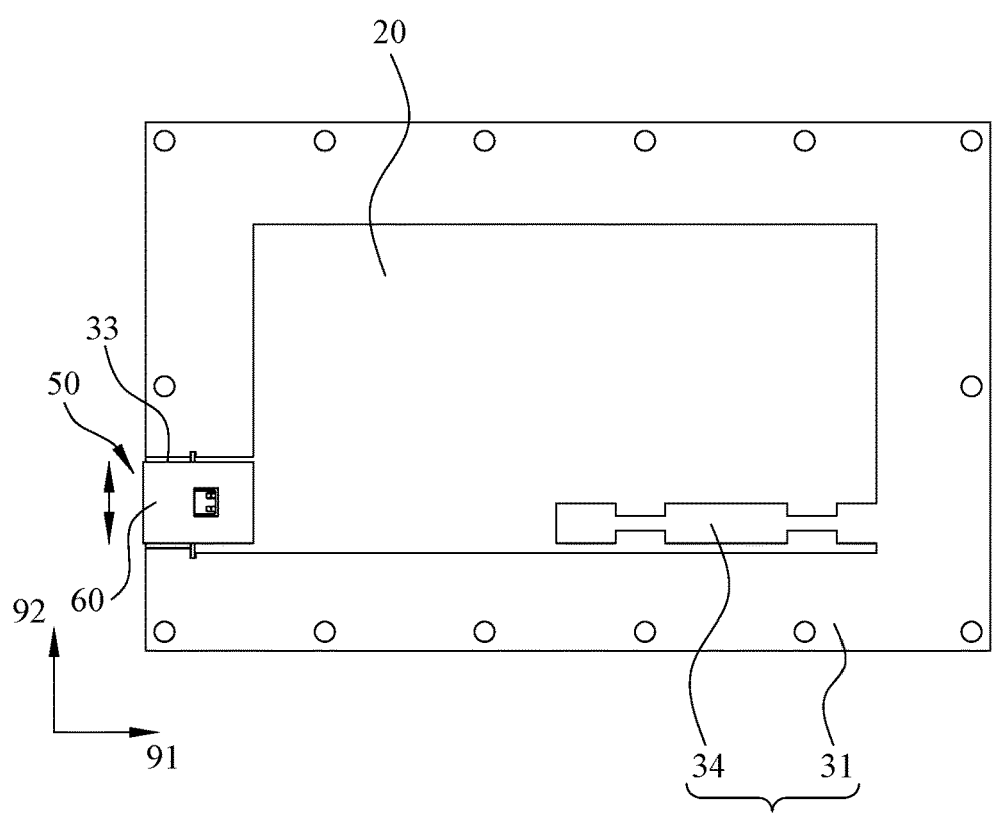
FIG. 9 is a bottom view of the fourth embodiment of the slim type tactile feedback device of the present invention.

FIG. 9 is an exploded view of the fourth embodiment of the present invention. The present embodiment is similar to the embodiment in FIG. 7, but the difference lies in the installation direction of the cantilever support 34 and the installation position of the vibration source 50. In the present embodiment, the vibration source 50 is arranged in the Y direction 92 of the frame 31, and the cantilever support 34 is connected to the frame 31 parallel to the X direction 91.

Figure 10:
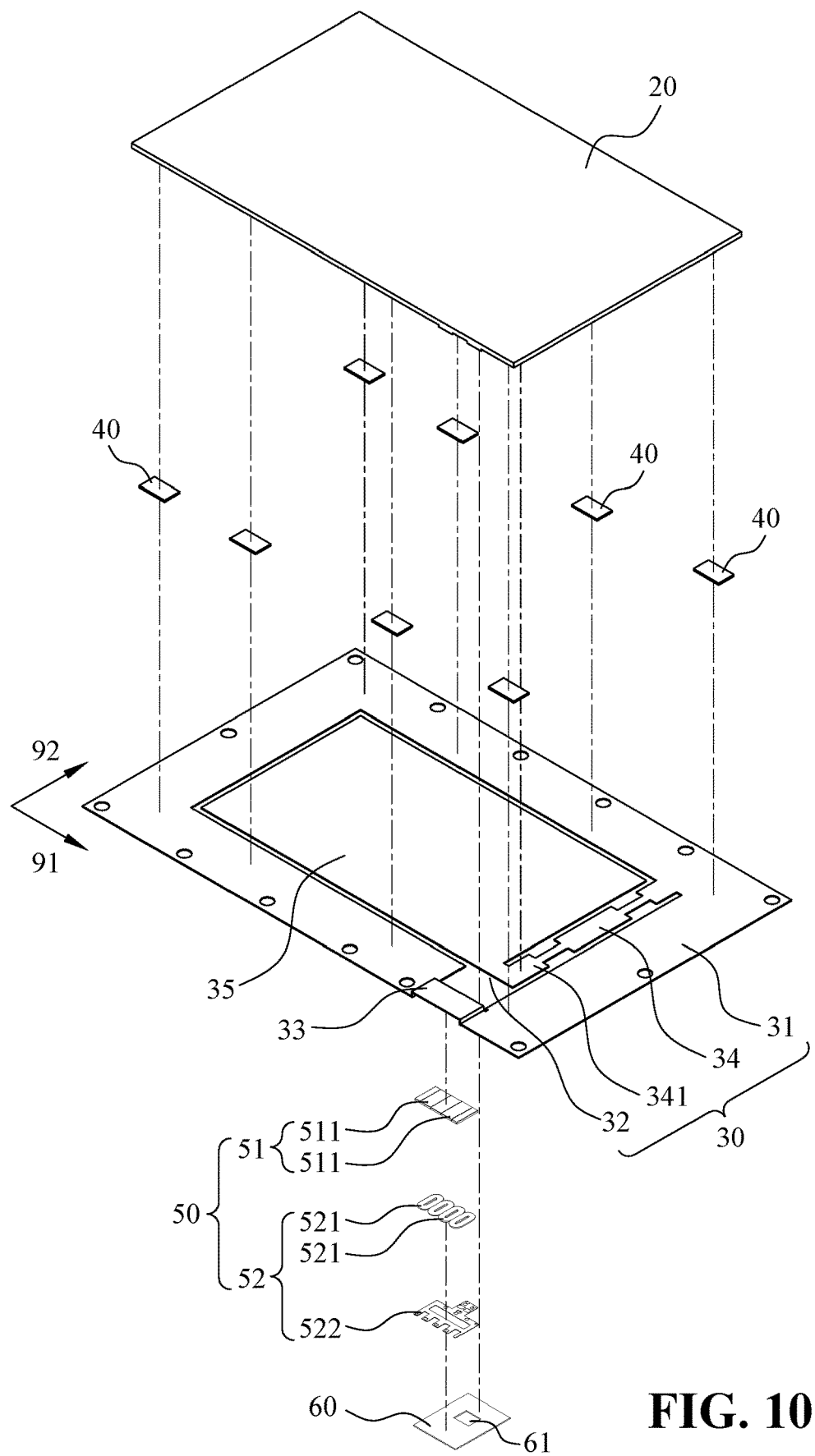
FIG. 10 is an exploded view of the fifth embodiment of the slim type tactile feedback device of the present invention.
Figure 11:
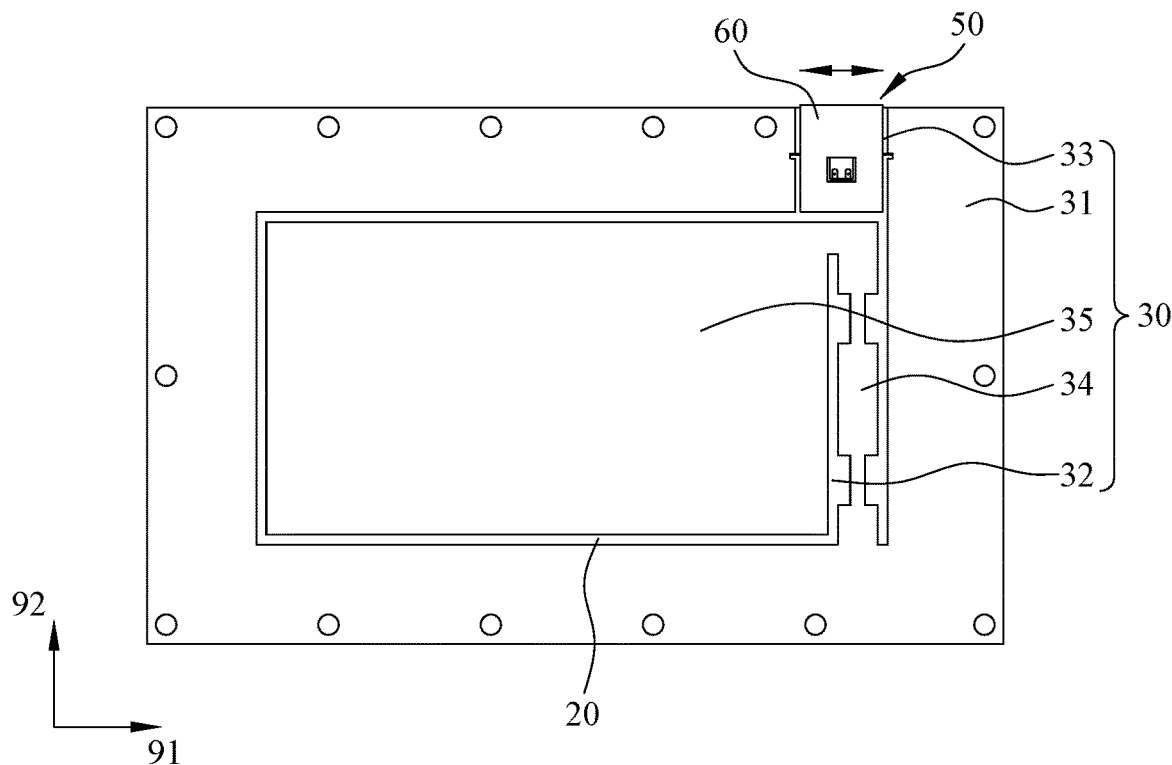
FIG. 11 is a bottom view of the fifth embodiment of the slim type tactile feedback device of the present invention.

FIG. 10 and FIG. 11 are an exploded view and a bottom view of the fifth embodiment of the present invention, respectively. In the present embodiment, the supporting frame 30 further includes a connecting plate 35, which is connected to the cantilever support 34 and is located in the void area 32. Specifically, the connecting plate 35 is connected to the end area 341. In the present embodiment, only the end area 341 is fixed to the substrate 20. The connecting plate 35 can prevent the substrate 20 from contacting the electronic components under the frame 31 after assembly, making the tactile feedback device safer in operation. In the present embodiment, the vibration direction generated by the vibration source 50 is the X direction 91, and the cantilever support 34 is parallel to the Y direction 92.

Figure 12:
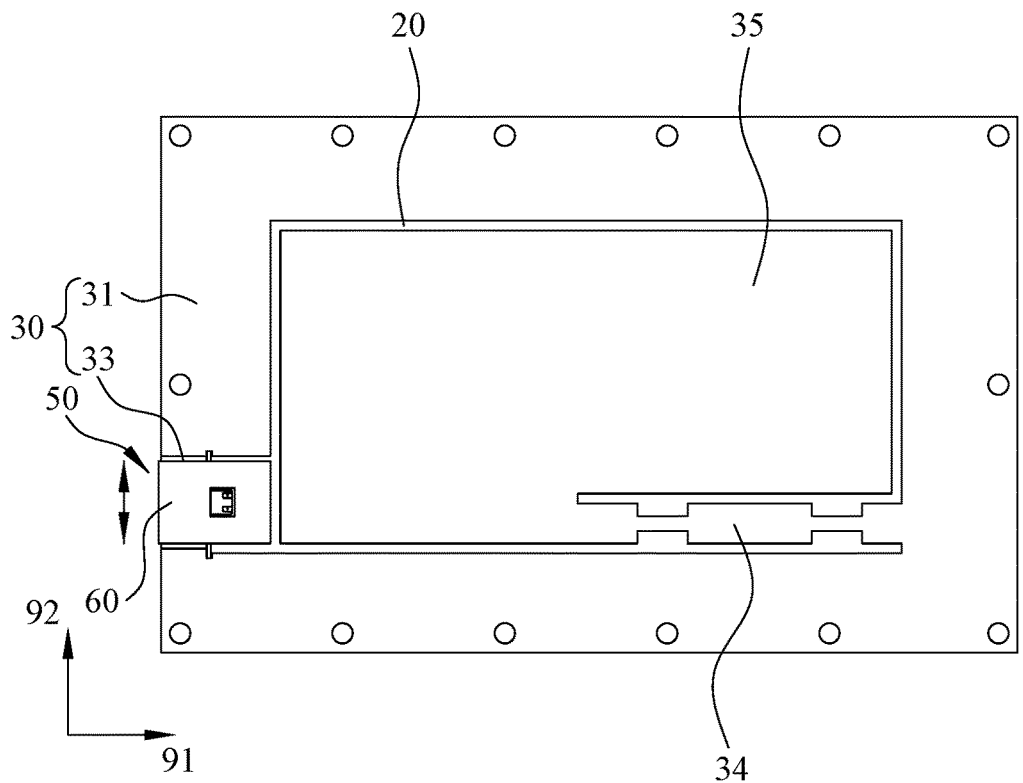
FIG. 12 is a bottom view of the sixth embodiment of the slim type tactile feedback device of the present invention.

FIG. 12 is a bottom view of the sixth embodiment of the present invention. The present embodiment is similar to the embodiment in FIG. 10, but the difference lies in the installation direction of the cantilever support 34 and the installation position of the vibration source 50. In the present embodiment, the vibration source 50 is arranged in the Y direction 92 of the frame 31, and the cantilever support 34 is connected to the frame 31 in parallel to the X direction 91.

Figure 13:
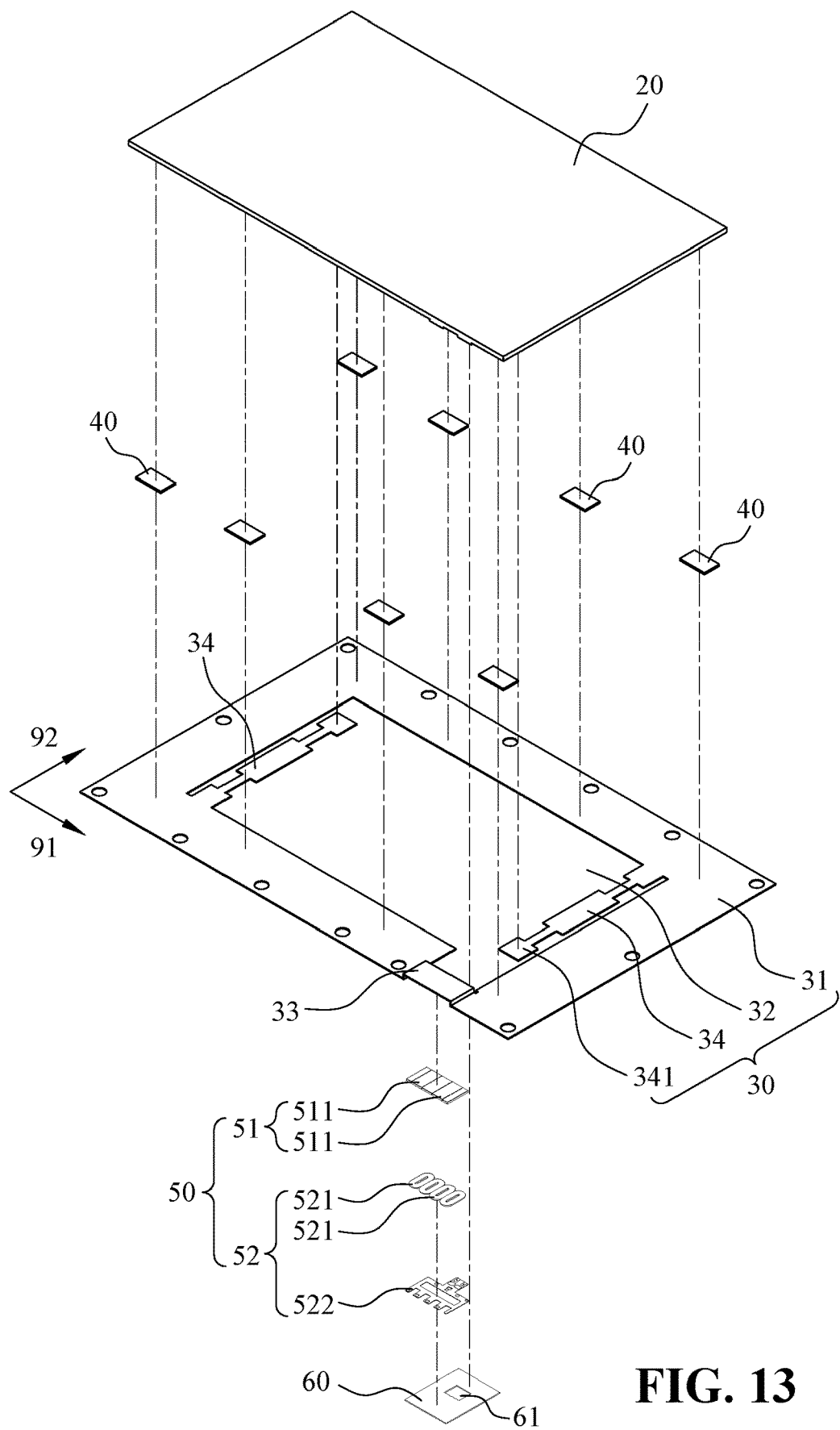
FIG. 13 is an exploded view of the seventh embodiment of the slim type tactile feedback device of the present invention.
Figure 14:
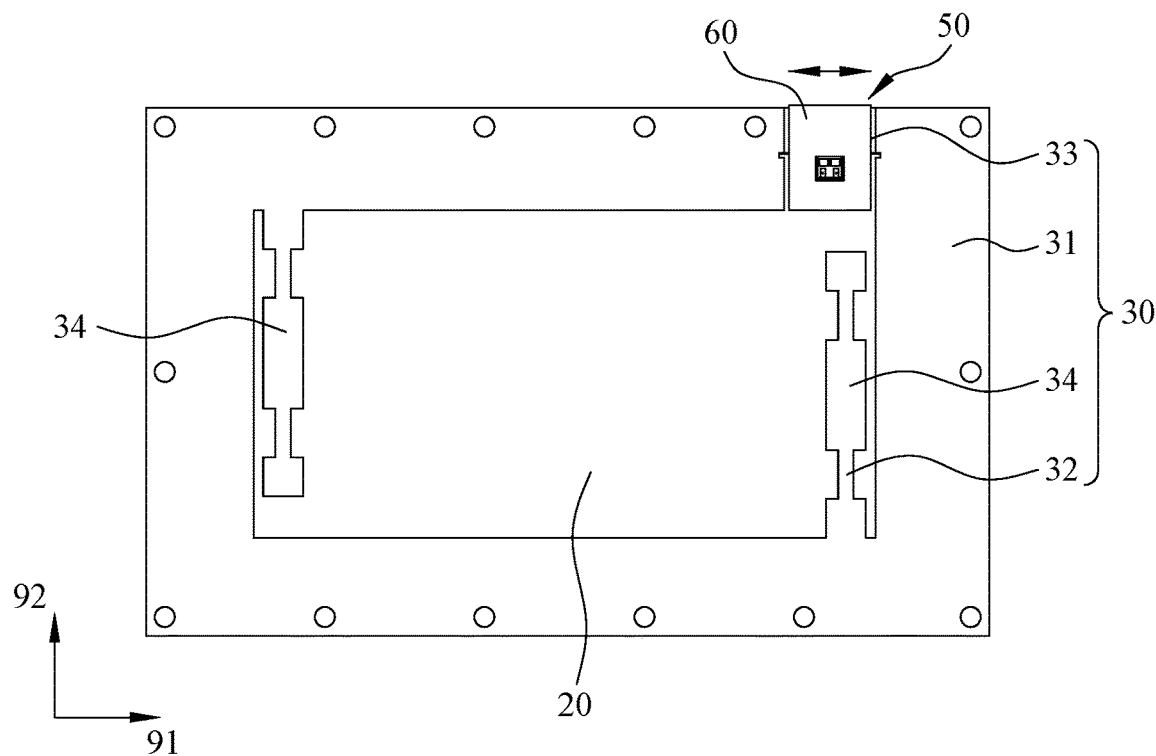
FIG. 14 is a bottom view of the seventh embodiment of the slim type tactile feedback device of the present invention.

FIG. 13 and FIG. 14 are an exploded view and a bottom view of the seventh embodiment of the present invention, respectively. In the present embodiment, the support frame 30 includes at least a pair of cantilever supports 34, the pair of cantilever supports 34 are connected to the frame 31, are parallel to each other and located on both sides of the void area 32, and the cantilever supports 34 are partially fixed to the substrate 20. The two cantilever supports 34 are respectively connected to the two opposite sides of the frame 31 and are arranged in reverse symmetry. In the present embodiment, the cantilever supports 34 are still fixed to the substrate 20 by the end area 341 far away from the end connected to the frame 31. The vibration direction generated by the vibration source 50 is the X direction 91, and the cantilever supports 34 are parallel to the Y direction 92. In the present embodiment, since a pair of the cantilever supports 34 are provided, and the cushion 40 achieves a resonance effect with the substrate 20 when the vibration source 50 vibrates, and satisfies the required vibration feedback effect. The cantilever support 34 increases the rigidity of Y direction 92 to resist the Z-axis inertia momentum generated by the vibration source 50 due to off-center vibration, thereby enabling the substrate 20 to maintain a uniform vibration feedback at each operating position.

Figure 15:
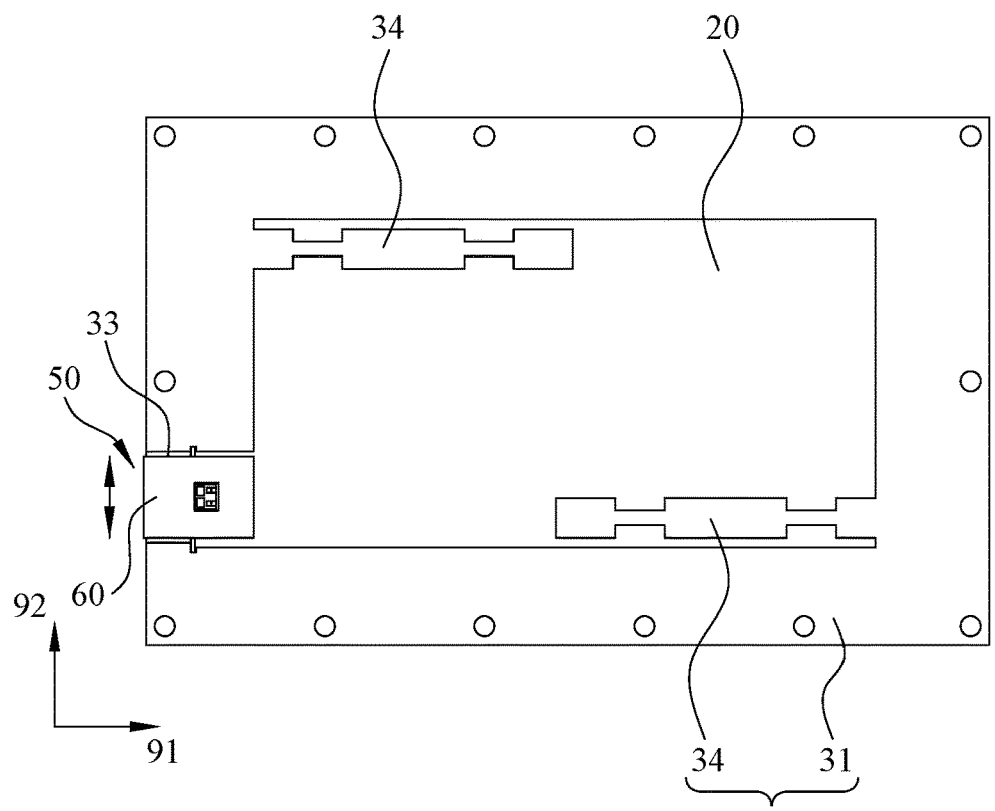
FIG. 15 is a bottom view of the eighth embodiment of the slim type tactile feedback device of the present invention.

FIG. 15 is a bottom view of the eighth embodiment of the present invention. The present embodiment is similar to the embodiment of FIG. 13. The difference lies in the installation direction of the cantilever supports 34 and the installation position of the vibration source 50. In the present embodiment, the vibration source 50 is arranged in the Y direction 92 of the frame 31, and the two cantilever supports 34 are connected to the frame 31 in parallel to the X direction 91.

Figure 16:
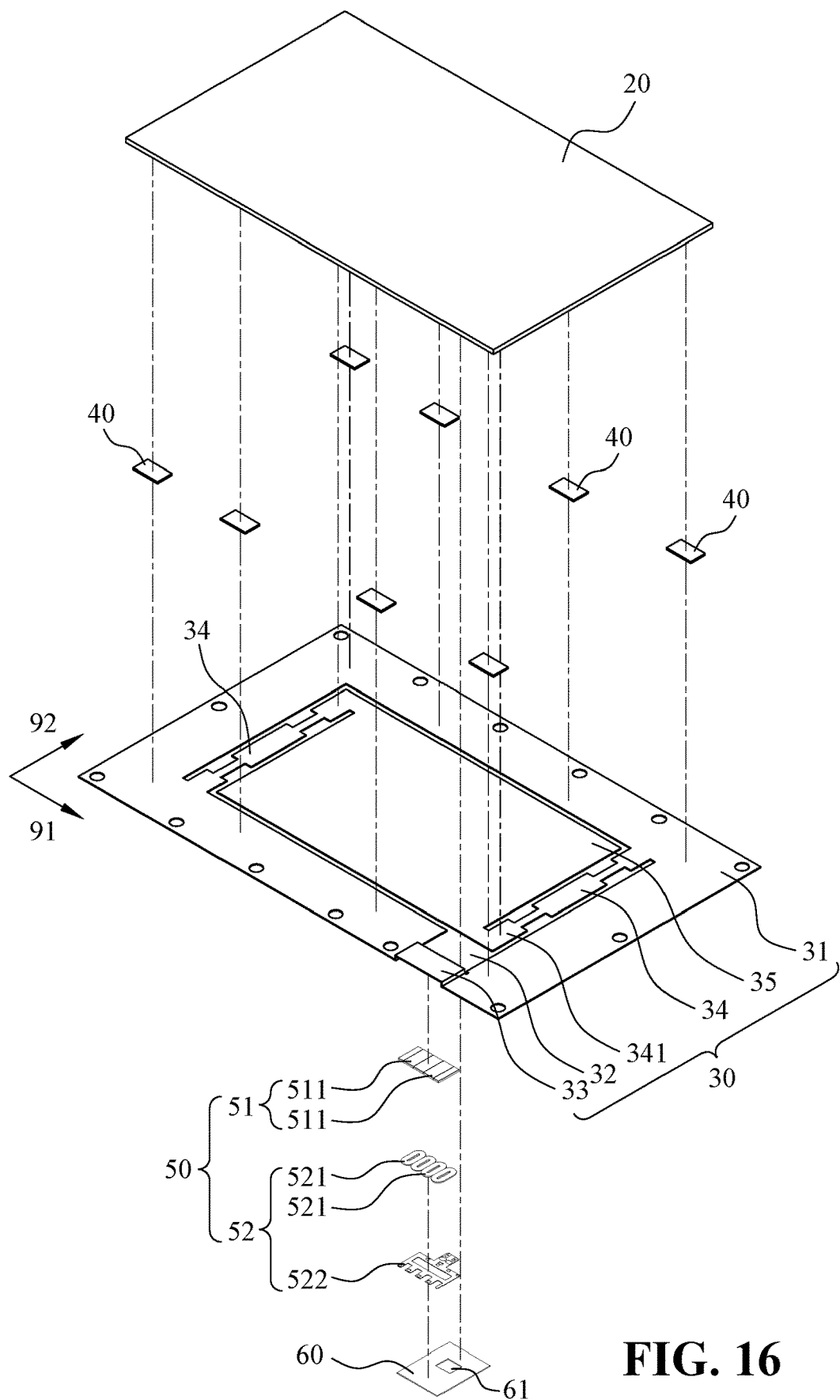
FIG. 16 is an exploded view of the ninth embodiment of the slim type tactile feedback device of the present invention.
Figure 17:
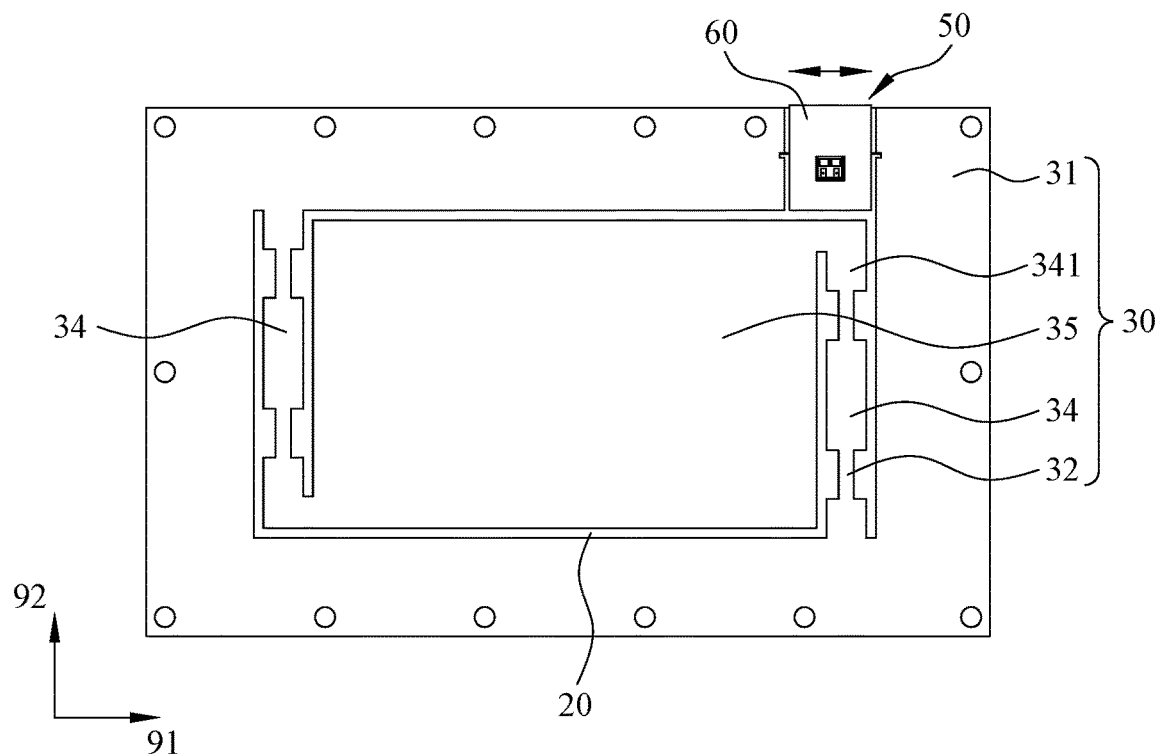
FIG. 17 is a bottom view of the ninth embodiment of the slim type tactile feedback device of the present invention.

FIG. 16 and FIG. 17 are an exploded view and a bottom view of the ninth embodiment of the present invention, respectively. In the present embodiment, the support frame 30 further includes the connecting plate 35, which is connected between the two cantilever supports 34 and is located in the void area 32. The connecting plate 35 can prevent the substrate 20 from contacting the electronic components under the frame 31, thus making the touch feedback device safer during operation. In the present embodiment, the vibration direction generated by the vibration source 50 is the X direction 91, and the cantilever support 34 is in parallel to the Y direction 92.

Figure 18:
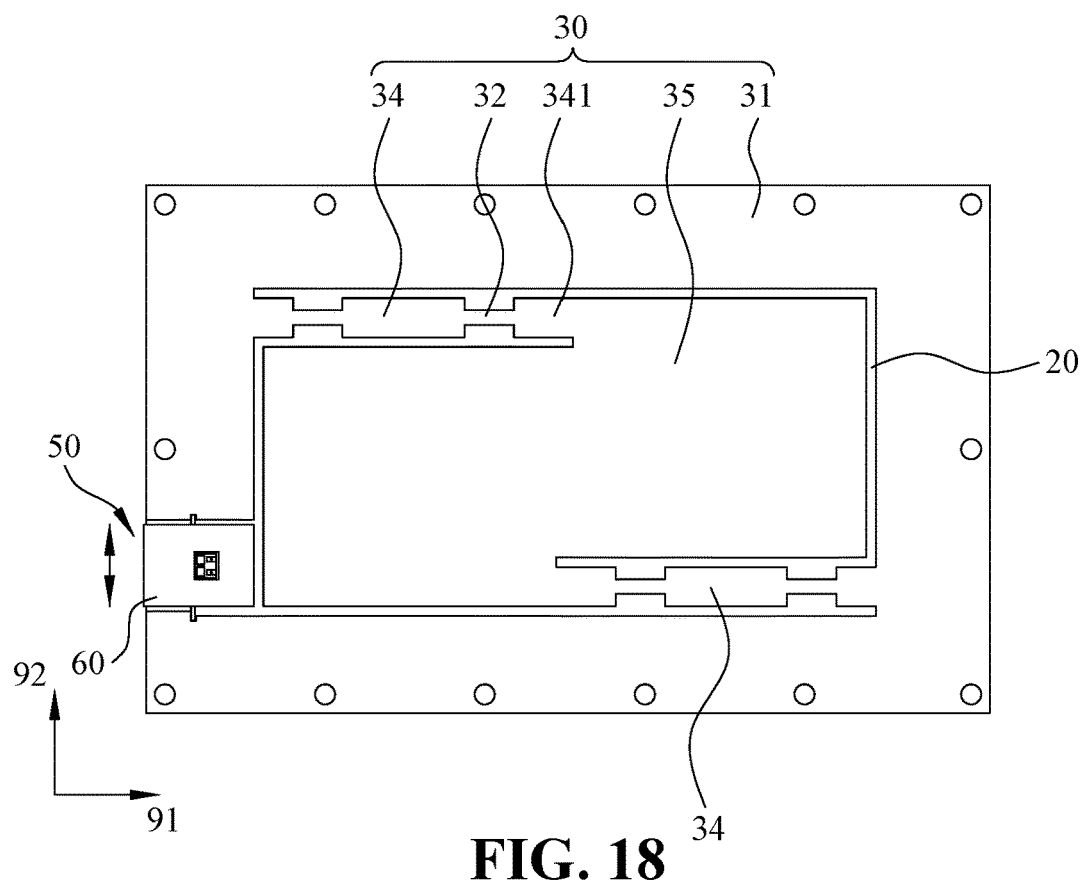
FIG. 18 is a bottom view of the tenth embodiment of the slim type tactile feedback device of the present invention.

FIG. 18 is a bottom view of the tenth embodiment of the present invention. The present embodiment is similar to the embodiment of FIG. 16, but the difference lies in the installation direction of the two cantilever supports 34 and the installation position of the vibration source 50. In the present embodiment, the vibration source 50 is arranged in the Y direction 92 of the frame 31, and the cantilever support 34 is connected to the frame 31 in parallel to the X direction 91.

Figure 19:
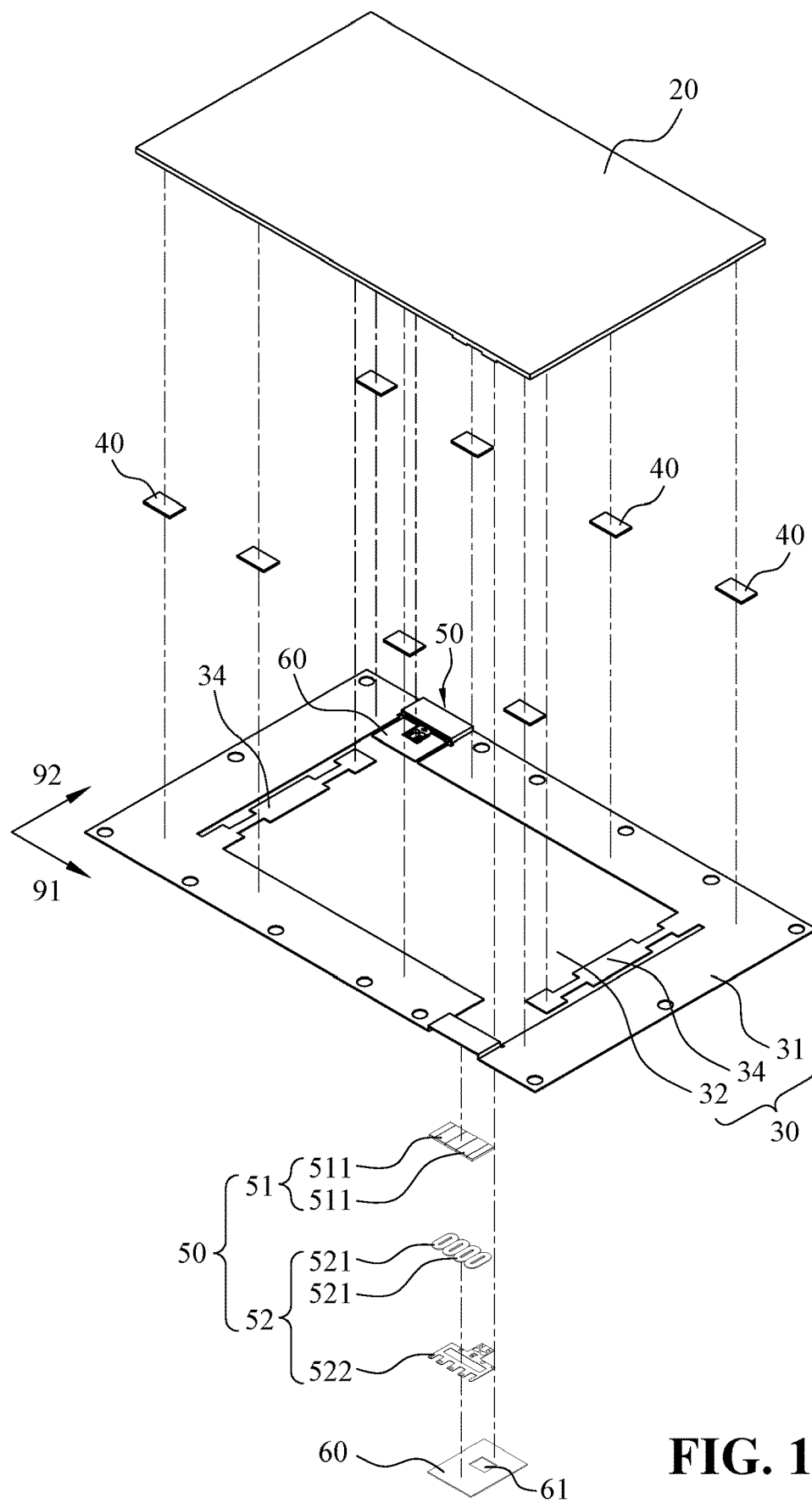
FIG. 19 is an exploded view of the eleventh embodiment of the slim type tactile feedback device of the present invention.
Figure 20:
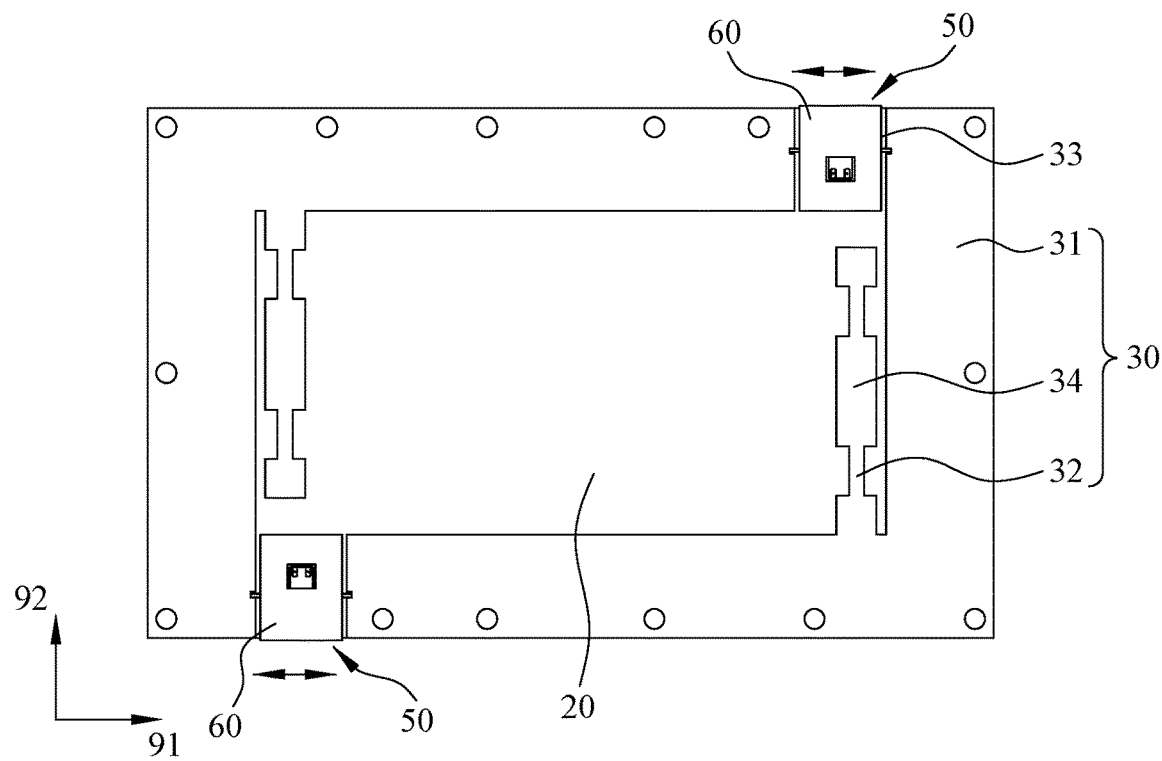
FIG. 20 is a bottom view of the eleventh embodiment of the slim type tactile feedback device of the present invention.

FIG. 19 and FIG. 20 are an exploded view and a bottom view of the eleventh embodiment of the present invention, respectively. In the present embodiment, the number of vibration sources 50 is increased to two, and the two vibration sources 50 are respectively arranged on two opposite sides of the frame 31, in the X direction 91. Two cantilever supports 34 are provided. The present embodiment still satisfies the requirement that the vibration direction generated by the vibration source 50 must be perpendicular to the cantilever support 34. Although the two vibration sources 50 are arranged in the X direction 91 of the frame 31, the vibration direction of the vibration source 50 is in parallel to the X direction 91, and the cantilever supports 34 are in parallel to the Y direction 92. Since there are two sets of vibrations source 50, the vibration feedback generated by the present embodiment is relatively strong.

Figure 21:
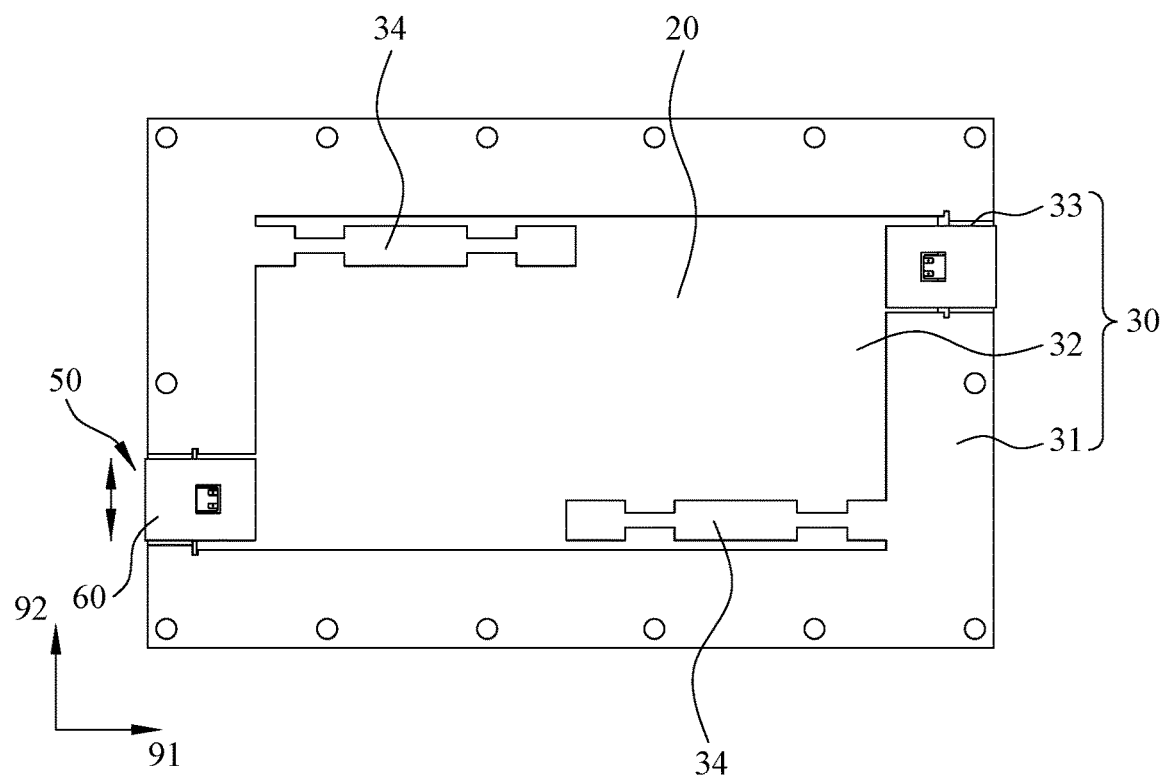
FIG. 21 is a bottom view of the twelfth embodiment of the slim type tactile feedback device of the present invention.

FIG. 21 is a bottom view of the twelfth embodiment of the present invention. The present embodiment is similar to the embodiment in FIG. 19, but the difference lies in the installation direction of the two cantilever supports 34 and the installation positions of the two vibration sources 50. In the present embodiment, the two vibration sources 50 are arranged in the Y direction 92 of the frame 31, and the cantilever supports 34 are connected to the frame 31 in parallel to the X direction 91.

Figure 22:
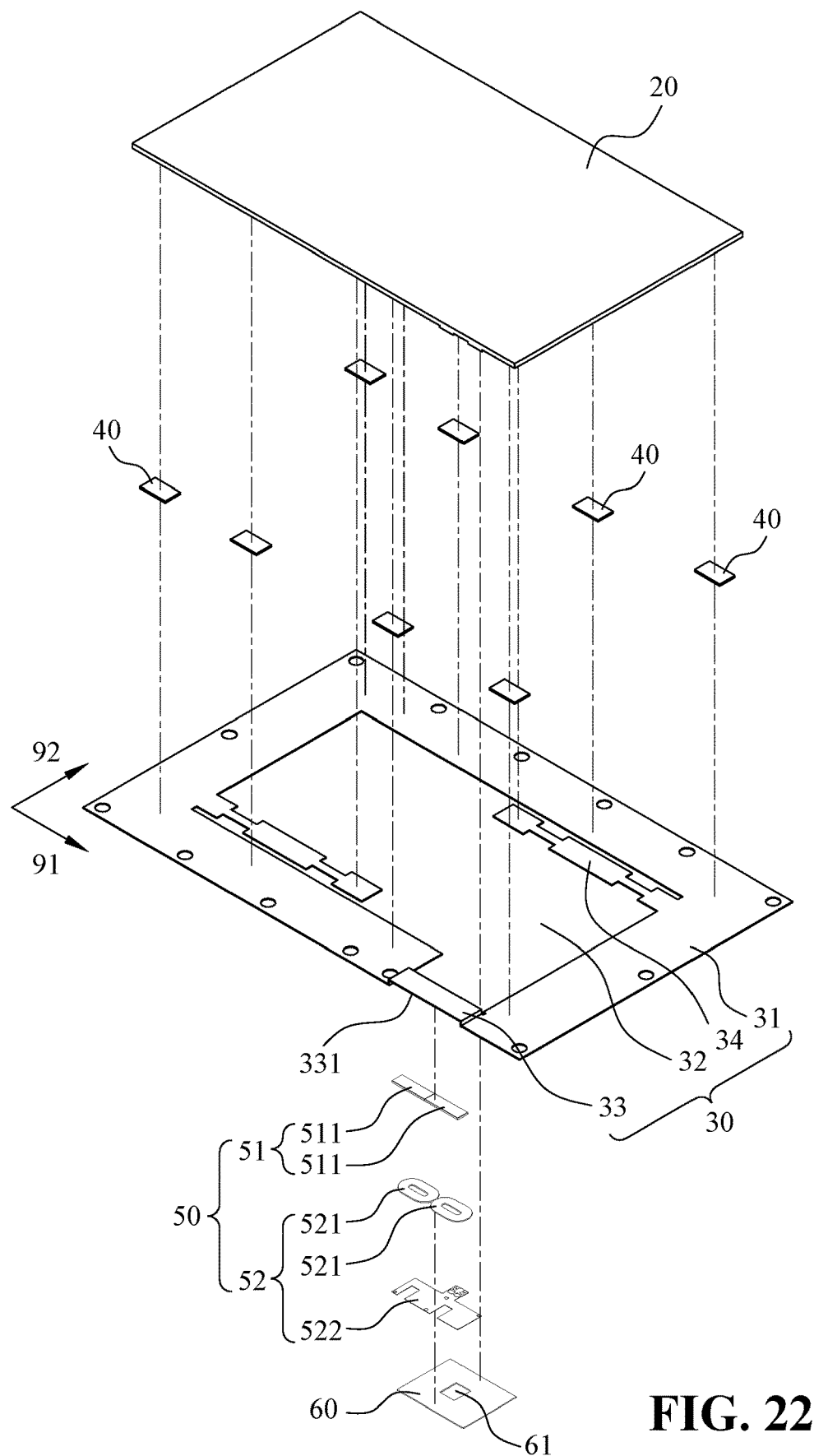
FIG. 22 is an exploded view of the thirteenth embodiment of the slim type tactile feedback device of the present invention.
Figure 23:
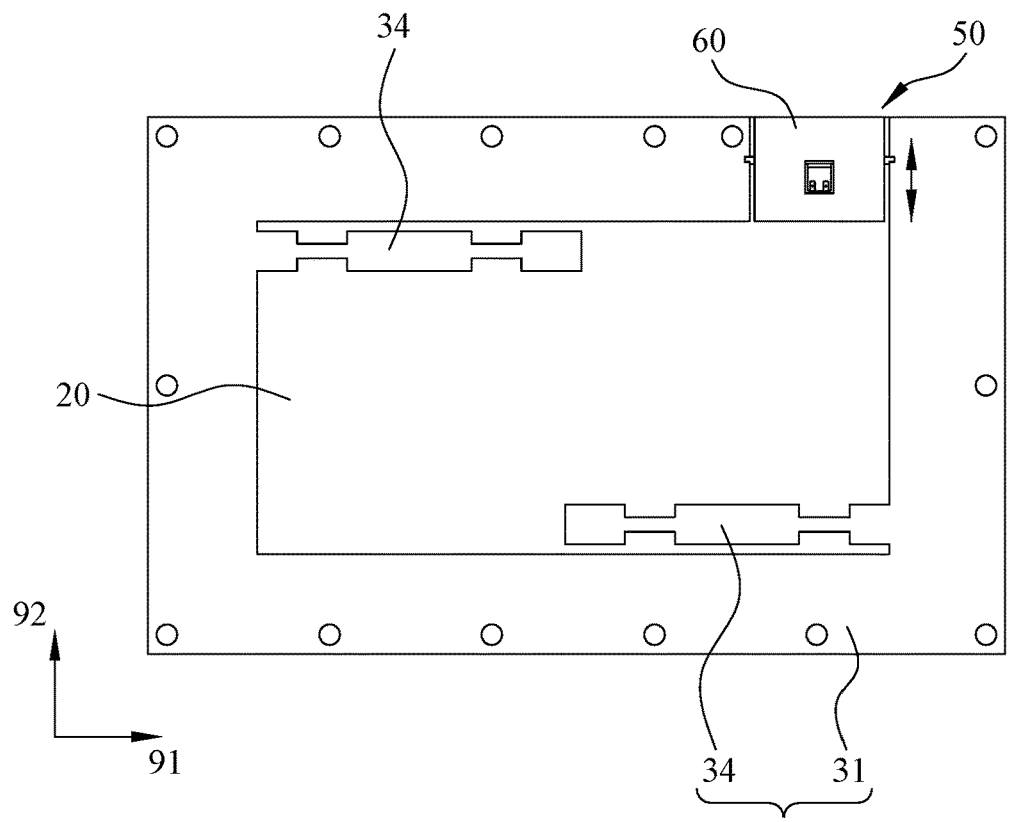
FIG. 23 is a bottom view of the thirteenth embodiment of the slim type tactile feedback device of the present invention.

FIG. 22 and FIG. 23 are an exploded view and a bottom view of the thirteenth embodiment of the present invention, respectively. In the present embodiment, the direction of the back-and-forth vibration of the vibration source 50 is changed. In the foregoing embodiment, the vibration direction generated by the vibration source 50 is parallel to the direction where the frame 3 is set, but it is not limited thereto. In the present embodiment, the protruding support 33 is still located in a partial section of the frame 31. Although the protruding support 33 is disposed in the X direction 91, its length is longer than that in the foregoing embodiment. The magnet set 51 is still composed of a plurality of the magnets 511 arranged side by side, and the plurality of the magnets 511 are fixed to the inner wall 331 downward. The coil set 52 still includes a plurality of the coils 521 and the circuit board 522. The plurality of the coils 521 are arranged side by side and fixed to the circuit board 522. The circuit board 522 is fixed to the overlapping plate 60, and the overlapping plate 60 is connected to the substrate 20 in a cantilever shape. In the present embodiment, the magnetic poles of the N pole and S pole of the magnet 511 are arranged parallel to the Y direction 92, so the vibration direction generated by the vibration source 50 is the Y direction 92. In contrast, the two cantilever supports 34 are connected to the frame 31 in parallel to the X direction 91 and are located on both sides of the void area 32.

Figure 24:
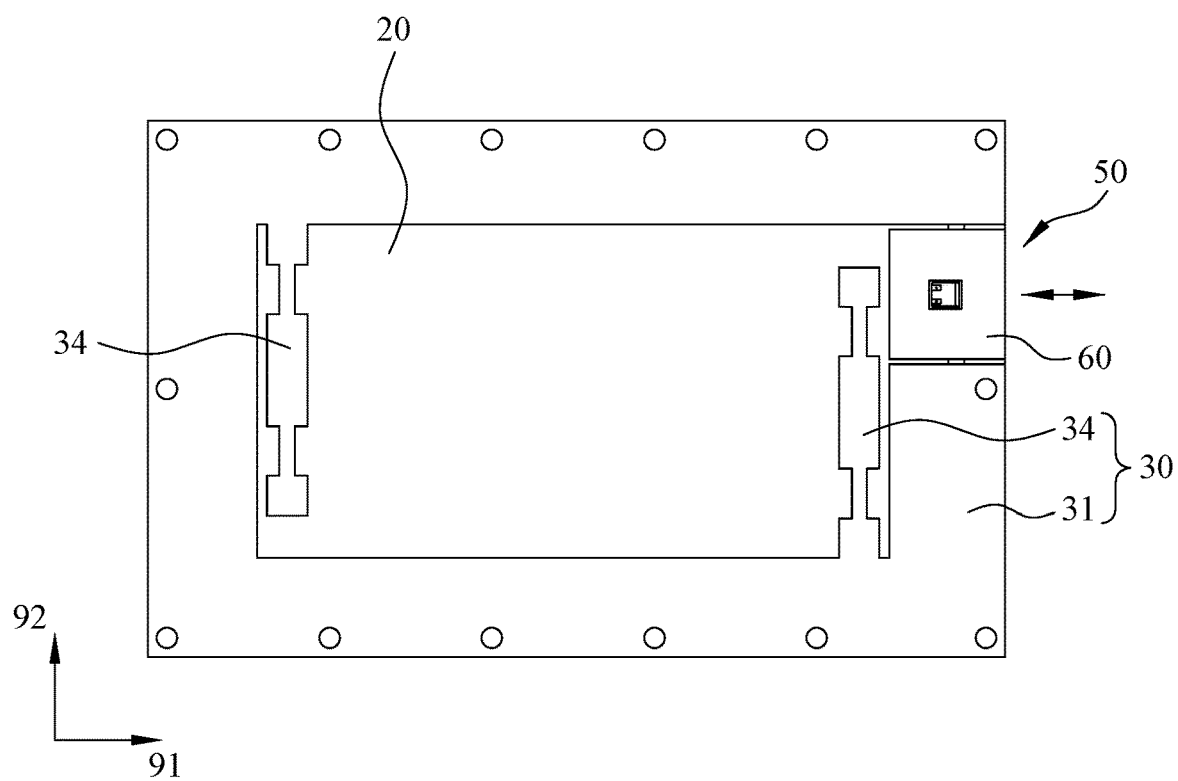
FIG. 24 is a bottom view of the fourteenth embodiment of the slim type tactile feedback device of the present invention.

FIG. 24 is a bottom view of the fourteenth embodiment of the present invention. The present embodiment is similar to the embodiment in FIG. 22, but the difference lies in the installation direction of the two cantilever supports 34 and the installation position of the vibration source 50. In the present embodiment, the vibration source 50 is arranged in the Y direction 92 of the frame 31 and generates a vibration direction perpendicular to the Y direction 92. The cantilever supports 34 are connected to the frame 31 in parallel with the Y direction 92 and is located in the void area 32 on both sides. In summary, the vibration source 50 of the present invention will form different magnetization directions depending on the arrangement of the magnet 511 and the coil 521, so that the back-and-forth vibration direction of the vibration source 50 is parallel or perpendicular to the frame 31 where the vibration source 50 is located, but the vibration direction must be perpendicular to the extension direction of the cantilever supports 34.

Figure 25:
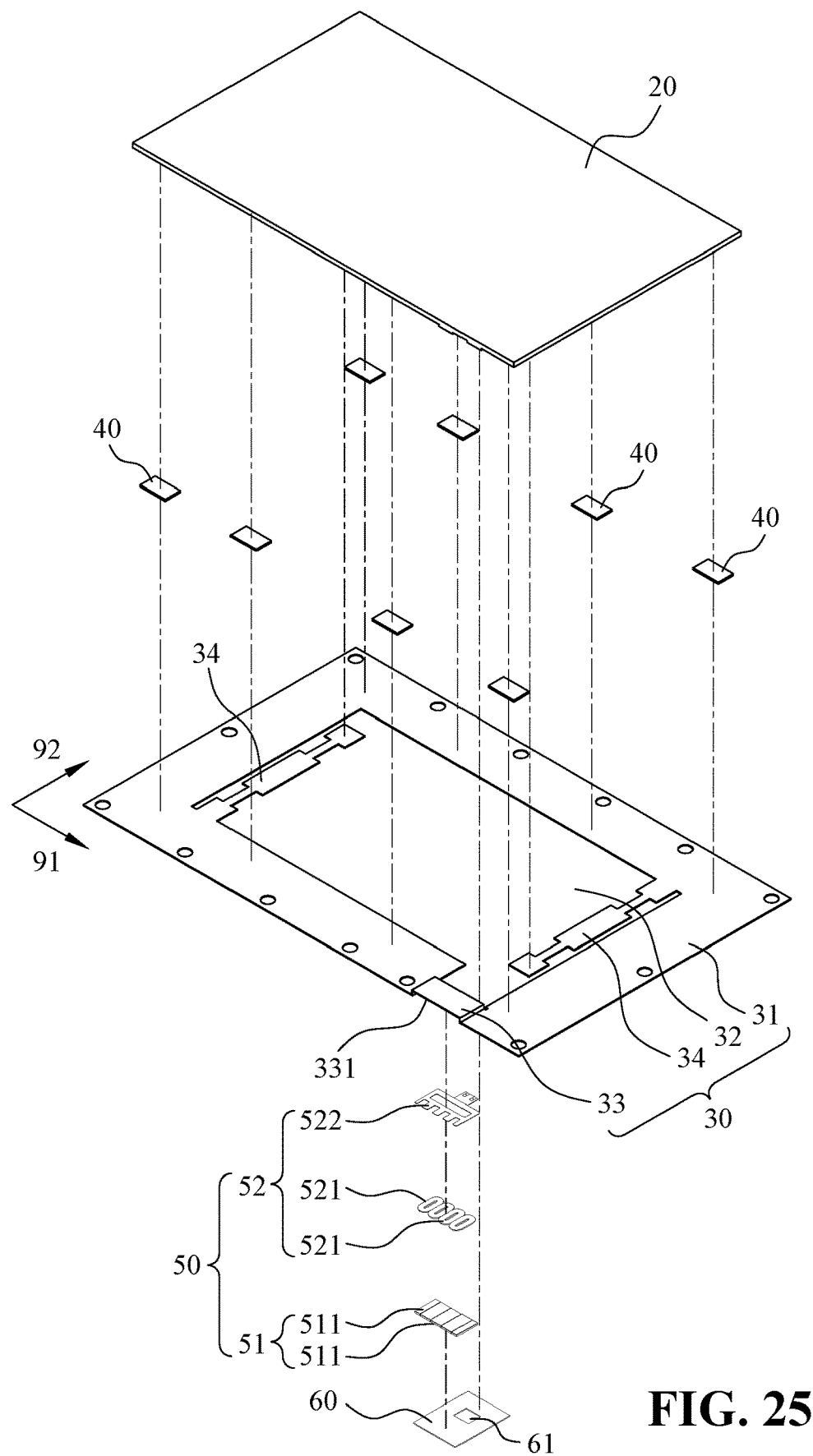
FIG. 25 is an exploded view of the fifteenth embodiment of the slim type tactile feedback device of the present invention.
Figure 26:
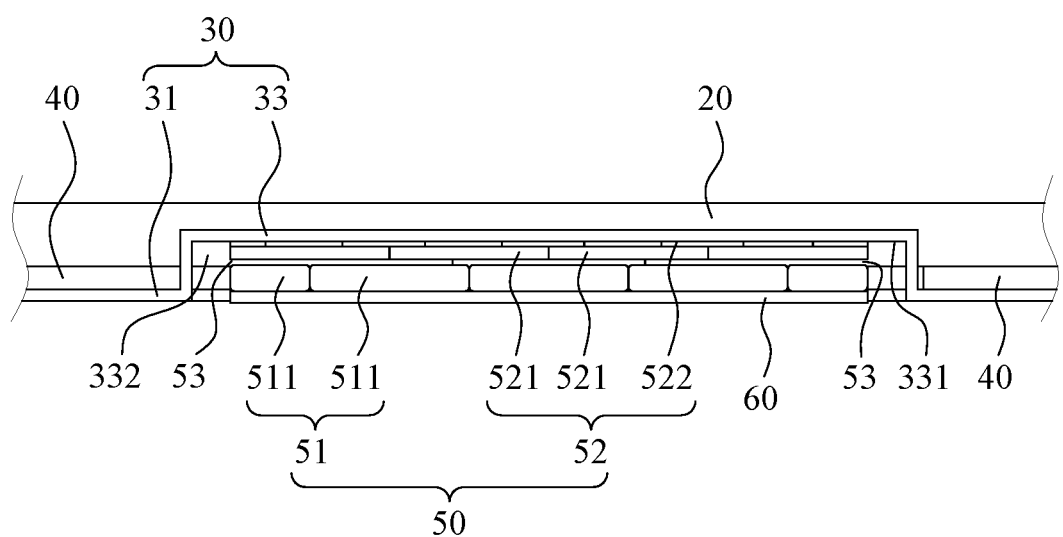
FIG. 26 is an enlarged side view of the position of the vibration source of the fifteenth embodiment of the slim type tactile feedback device of the present invention.

FIG. 25 and FIG. 26 are an exploded view and a side view of a fifteenth embodiment of the present invention, respectively. The present embodiment mainly changes the positions of the magnet set 51 and the coil set 52. In the present embodiment, the vibration source 50 still includes the magnet set 51 and the coil set 52, but the coil set 52 is located in the accommodating space 332, and the magnet set 51 is fixed to the overlapping plate 60 and is located outside the substrate 20. The position of the magnet set 51 corresponds to the coil set 52 and is separated by a gap 53. When the vibration source 50 is operated, the substrate 20 will be driven to vibrate back and forth. Specifically, the coil set 52 includes the plurality of the coils 521 and the circuit board 522, and the plurality of the coils 521 are arranged side by side and fixed to the circuit board 522, and then the circuit board 522 is fixed to the inner wall 331. In the present embodiment, the circuit board 522 is partially curved. The magnet set 51 includes the plurality of the magnets 511, and the magnets 511 are fixed on the overlapping plate 60. The overlapping plate 60 also has a window 61 for the partial bending section of the circuit board 522 to extend there. As shown in FIG. 26, the positions of the magnets 511 after assembly correspond to the coils 521, and the gap 53 exists. In the present embodiment, the vibration source 50 generates a vibration direction parallel to the X direction 91 and perpendicular to the extension direction of the cantilever support 34.

Similarly, in the present invention, the design of having the coil set 52 fixed to the protruding support 33 and the magnet set 51 fixed to the overlapping plate 60 can also be applied to other various embodiments. For example, the vibration source 50 can be is located at different positions of the frame 31, or the support frame 30 is provided with at least one of the cantilever support 34, the connecting plate 35, or the frame 31 is provided with two sets of vibration sources 50 in various embodiments.

In summary, a slim type tactile feedback device of the present invention is to arrange the vibration source 50 between the protruding support 33 and the overlapping plate 60 and outside the tactile effective area of the substrate 20, so that the stacked size of the location where the vibration source 50 is located is smaller than the size of the overall tactile feedback device, thereby achieving the goal of slimming.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A tactile feedback device, comprising:
a substrate;
at least an overlapping plate fixed to the substrate and extending to an outside of the substrate in a cantilever manner;
a support frame comprising a frame, a void area formed by the frame, and at least a protruding support, the protruding support being a partial section of the frame, and the protruding support being U-shaped and protruding in a direction the same as the direction in which the substrate is arranged on the frame, and the protruding support having an inner wall and forming an accommodating space;
a plurality of cushions fixed between the substrate and the frame; and
at least a vibration source comprising a magnet set and a coil set, the magnet set and the coil set being fixed between the protruding support and the overlapping plate and located outside the substrate, the coil set being positioned corresponding to the magnet set and separated by a gap, the gap increasing when the substrate is pressed by a finger during a touch operation, and the vibration source driving the substrate to generate back-and-forth vibration;
wherein top of the protruding support is lower than a top surface of the substrate, and a stack size at a position where the vibration source is located is smaller than the size of the substrate and the support frame after being stacked; and
wherein the magnet set is located in the accommodating space, the coil set is fixed on the overlapping plate, the magnet set includes a plurality of magnets arranged side by side, and the plurality of magnets are fixed on the inner wall, the coil set includes a plurality of coils and a circuit board, the plurality of coils are fixed on the circuit board side by side, and the circuit board is fixed on the overlapping plate, so that the plurality of coils are on an outer side of the substrate and are located correspondingly to the plurality of magnets located above.

2. The tactile feedback device according to claim 1, wherein the magnets are arranged in a direction so that the magnetic pole is parallel to the frame where the vibration source is located, and the direction of the back-and-forth vibration generated by the vibration source is parallel to the frame.

3. The tactile feedback device according to claim 1, wherein the magnets are arranged in a direction so that the magnetic pole is perpendicular to the frame where the vibration source is located, and the direction of the back-and-forth vibration generated by the vibration source is perpendicular to the frame.

4. A tactile feedback device, comprising:
- a substrate;
- at least an overlapping plate fixed to the substrate and extending to an outside of the substrate in a cantilever manner;
- a support frame comprising a frame, a void area formed by the frame, and at least a protruding support, the protruding support being a partial section of the frame, and the protruding support being U-shaped and protruding in a direction the same as the direction in which the substrate is arranged on the frame, the protruding support having an inner wall and forming an accommodating space;
- a plurality of cushions fixed between the substrate and the frame; and
- at least a vibration source comprising a magnet set and a coil set, the magnet set and the coil set being fixed between the protruding support and the overlapping plate and located outside the substrate, the coil set being positioned corresponding to the magnet set and separated by a gap, the gap increasing when the substrate is pressed by a finger during a touch operation, and the vibration source driving the substrate to generate back-and-forth vibration;
- wherein top of the protruding support is lower than a top surface of the substrate, and a stack size at a position where the vibration source is located is smaller than the size of the substrate and the support frame after being stacked; and
- wherein the coil set is located in the accommodating space, the magnet set is fixed on the overlapping plate, the coil set includes a plurality of coils and a circuit board, and the plurality of the coils are arranged side by side and fixed on the circuit board, the circuit board is fixed on the inner wall, the magnet set includes a plurality of magnets arranged side by side, and the plurality of the magnets are fixed on the overlapping plate, so that the plurality of magnets are on an outer side of the substrate and are located correspondingly to the plurality of coils located above.

5. A tactile feedback device, comprising:
- a substrate;
- at least an overlapping plate fixed to the substrate and extending to an outside of the substrate in a cantilever manner;
- a support frame comprising a frame, a void area formed by the frame, and at least a protruding support, the protruding support being a partial section of the frame, and the protruding support being U-shaped and protruding in a direction the same as the direction in which the substrate is arranged on the frame, the protruding support having an inner wall and forming an accommodating space;
- a plurality of cushions fixed between the substrate and the frame; and
- at least a vibration source comprising a magnet set and a coil set, the magnet set and the coil set being fixed between the protruding support and the overlapping plate and located outside the substrate, the coil set being positioned corresponding to the magnet set and separated by a gap, the gap increasing when the substrate is pressed by a finger during a touch operation, and the vibration source driving the substrate to generate back-and-forth vibration;
- wherein top of the protruding support is lower than a top surface of the substrate, and a stack size at a position where the vibration source is located is smaller than the size of the substrate and the support frame after being stacked; and
- wherein the frame has at least a pair of cantilever supports, the pair of cantilever supports are parallel to each other and located on two sides of the void area, the cantilever supports are partially fixed to the substrate, and the cantilever supports extend in a direction perpendicular to the direction of the back-and-forth vibration generated by the vibration source.

6. The tactile feedback device according to claim 5, wherein the end of each cantilever support away from the connection with the frame is an end area, and the end area is fixed to the substrate.

7. The tactile feedback device according to claim 5, wherein each cantilever support also forms at least a neck section with a narrower width.

8. The tactile feedback device according to claim 5, wherein the support frame further comprises a connecting plate, and the connecting plate is connected to the two cantilever supports and located in the void area.

9. The tactile feedback device according to claim 5, wherein a plurality of vibration sources is provided, and located at opposite positions between the protruding support and the overlapping plate, and two back-and-forth vibration directions generated by the vibration sources are parallel to one another and are perpendicular to extension directions of the cantilever supports.

10. The tactile feedback device according to claim 5, wherein the substrate is one of a touch pad, a flat keyboard, and a touch screen of a tablet computer.

* * * * *